US008516045B2

(12) United States Patent  
Ordille et al.

(10) Patent No.: US 8,516,045 B2
(45) Date of Patent: *Aug. 20, 2013

(54) METHOD AND APPARATUS FOR AUTOMATIC NOTIFICATION AND RESPONSE BASED ON COMMUNICATION FLOW EXPRESSIONS HAVING DYNAMIC CONTEXT

(75) Inventors: Joann J. Ordille, South Orange, NJ (US); John Hamilton Slye, Bridgewater, NJ (US); Patrick Tendick, Basking Ridge, NJ (US); Qian Yang, Bound Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1689 days.

This patent is subject to a terminal disclaimer.

(21) Appl. No.: 11/083,365

(22) Filed: Mar. 17, 2005

(65) Prior Publication Data

US 2005/0223070 A1    Oct. 6, 2005

Related U.S. Application Data

(60) Provisional application No. 60/554,232, filed on Mar. 18, 2004.

(51) Int. Cl.
*G06F 15/16* (2006.01)
*H04L 12/28* (2006.01)

(52) U.S. Cl.
USPC ........... 709/204; 709/206; 709/228; 709/229; 709/234; 370/390

(58) Field of Classification Search
USPC .................................. 709/206, 204, 229, 234
See application file for complete search history.

(56) References Cited

U.S. PATENT DOCUMENTS

| 5,559,867 A | 9/1996 | Langsenkamp et al. |
| 5,812,865 A | 9/1998 | Theimer et al. |
| 5,859,967 A | 1/1999 | Kaufeld et al. |
| 5,873,084 A | 2/1999 | Bracho et al. |

(Continued)

FOREIGN PATENT DOCUMENTS

| CA | 2486135 A1 | 11/2003 |
| JP | 8008967 A | 1/1996 |

(Continued)

OTHER PUBLICATIONS

"EP Application No. 05 251 608.5 Examination Report Sep. 27, 2006", , Publisher: EPO, Published in: EP.

(Continued)

*Primary Examiner* — Wing Chan
*Assistant Examiner* — David X Yi
(74) *Attorney, Agent, or Firm* — IP Spring Corporation

(57) ABSTRACT

Methods and apparatus are disclosed for automatic notification and response based on communication flow expressions having dynamic context. A message is provided from a sender to at least one recipient in accordance with a communication flow having a plurality of potential paths. The communication flow is controlled by a communication flow expression having a dynamic context, wherein the communication flow expression contains at least one primitive keyword indicating how the message should be processed. The dynamic context of the communication flow expression may be established using one or more labels or a context function. A number of primitive keywords are provided that allow a communication flow expression to react to a dynamic context.

30 Claims, 28 Drawing Sheets

(56) References Cited

U.S. PATENT DOCUMENTS

| | | | |
|---|---|---|---|
| 5,892,906 | A | 4/1999 | Chou et al. |
| 5,892,909 | A | 4/1999 | Grasso et al. |
| 5,912,947 | A | 6/1999 | Langsenkamp et al. |
| 5,946,386 | A | 8/1999 | Rogers et al. |
| 5,999,978 | A | 12/1999 | Angal et al. |
| 6,021,443 | A | 2/2000 | Bracho et al. |
| 6,026,153 | A | 2/2000 | Fuller et al. |
| 6,032,188 | A | 2/2000 | Mairs et al. |
| 6,037,934 | A | 3/2000 | Himmel et al. |
| 6,041,360 | A | 3/2000 | Himmel et al. |
| 6,091,724 | A | 7/2000 | Chandra et al. |
| 6,098,099 | A | 8/2000 | Ellesson et al. |
| 6,112,246 | A | 8/2000 | Horbal et al. |
| 6,158,007 | A | 12/2000 | Moreh et al. |
| 6,173,310 | B1 | 1/2001 | Yost et al. |
| 6,195,703 | B1 | 2/2001 | Blumenau et al. |
| 6,201,856 | B1 | 3/2001 | Orwick et al. |
| 6,205,148 | B1 | 3/2001 | Takahashi et al. |
| 6,208,995 | B1 | 3/2001 | Himmel et al. |
| 6,211,871 | B1 | 4/2001 | Himmel et al. |
| 6,226,360 | B1 | 5/2001 | Goldberg et al. |
| 6,343,321 | B2 | 1/2002 | Patki et al. |
| 6,381,594 | B1 | 4/2002 | Eichstaedt et al. |
| 6,404,880 | B1 | 6/2002 | Stevens |
| 6,427,001 | B1 | 7/2002 | Contractor et al. |
| 6,442,565 | B1 | 8/2002 | Tyra et al. |
| 6,446,114 | B1 | 9/2002 | Bulfer et al. |
| 6,456,594 | B1 | 9/2002 | Kaplan et al. |
| 6,457,046 | B1 | 9/2002 | Munakata |
| 6,463,462 | B1 | 10/2002 | Smith et al. |
| 6,480,578 | B1 | 11/2002 | Allport |
| 6,480,885 | B1 | 11/2002 | Olivier |
| 6,483,804 | B1 | 11/2002 | Muller et al. |
| 6,502,093 | B1 | 12/2002 | Bhatt et al. |
| 6,507,817 | B1 | 1/2003 | Wolfe et al. |
| 6,557,054 | B2 | 4/2003 | Reisman |
| 6,564,261 | B1 | 5/2003 | Gudjonsson et al. |
| 6,578,000 | B1 | 6/2003 | Dodrill et al. |
| 6,604,093 | B1 | 8/2003 | Etzion et al. |
| 6,633,630 | B1 | 10/2003 | Owens et al. |
| 6,643,661 | B2 | 11/2003 | Polizzi et al. |
| 6,643,682 | B1 | 11/2003 | Todd et al. |
| 6,643,684 | B1 | 11/2003 | Malkin et al. |
| 6,643,705 | B1 * | 11/2003 | Wallace et al. ............... 709/240 |
| 6,654,770 | B2 | 11/2003 | Kaufman |
| 6,671,715 | B1 | 12/2003 | Langseth et al. |
| 6,680,943 | B1 | 1/2004 | Gibson et al. |
| 6,687,742 | B1 | 2/2004 | Iwazaki |
| 6,689,742 | B1 | 2/2004 | Cerundolo et al. |
| 6,725,333 | B1 | 4/2004 | Degenaro et al. |
| 6,728,715 | B1 | 4/2004 | Astley et al. |
| 6,754,832 | B1 | 6/2004 | Godwin et al. |
| 6,816,878 | B1 | 11/2004 | Zimmers et al. |
| 6,868,498 | B1 | 3/2005 | Katsikas |
| 6,886,043 | B1 | 4/2005 | Mauger et al. |
| 6,895,406 | B2 | 5/2005 | Fables et al. |
| 6,910,070 | B1 | 6/2005 | Mishra et al. |
| 6,919,792 | B1 | 7/2005 | Battini et al. |
| 6,965,917 | B1 | 11/2005 | Aloni et al. |
| 6,971,065 | B2 | 11/2005 | Austin |
| 6,990,633 | B1 | 1/2006 | Miyasaka et al. |
| 7,016,477 | B2 | 3/2006 | Contractor |
| 7,032,030 | B2 | 4/2006 | Codignotto |
| 7,049,971 | B2 | 5/2006 | Guillory |
| 7,084,775 | B1 | 8/2006 | Smith |
| 7,103,592 | B2 | 9/2006 | Huret |
| 7,133,869 | B2 | 11/2006 | Bryan et al. |
| 7,216,145 | B2 | 5/2007 | Colling |
| 7,219,153 | B1 | 5/2007 | Day |
| 7,228,331 | B2 | 6/2007 | Wang |
| 7,249,197 | B1 | 7/2007 | Roestenburg et al. |
| 7,278,065 | B2 | 10/2007 | Conkel |
| 7,283,045 | B1 | 10/2007 | Manz |
| 7,287,230 | B2 | 10/2007 | Austin et al. |
| 7,305,448 | B2 | 12/2007 | Go |
| 7,346,662 | B2 | 3/2008 | Koch et al. |
| 7,359,493 | B1 | 4/2008 | Wang et al. |
| 7,372,833 | B2 | 5/2008 | Kyronaho et al. |
| 7,409,430 | B2 | 8/2008 | Leukert-Knapp et al. |
| 7,418,085 | B2 | 8/2008 | Rodkey et al. |
| 7,424,518 | B2 | 9/2008 | Go |
| 7,436,947 | B2 | 10/2008 | Ordille et al. |
| 7,452,268 | B2 | 11/2008 | Annunziata |
| 7,458,080 | B2 | 11/2008 | Parker et al. |
| 7,469,272 | B2 | 12/2008 | McKee et al. |
| 7,474,892 | B2 | 1/2009 | Skinner et al. |
| 7,496,183 | B1 | 2/2009 | Rodkey et al. |
| 7,519,165 | B1 | 4/2009 | Rodkey et al. |
| 7,522,038 | B2 | 4/2009 | Edwards et al. |
| 7,529,850 | B2 | 5/2009 | Verma et al. |
| 7,558,558 | B2 | 7/2009 | Langsenkamp et al. |
| 7,558,951 | B2 | 7/2009 | Munshi |
| 7,577,581 | B1 | 8/2009 | Schuyler |
| 7,624,171 | B1 | 11/2009 | Rodkey et al. |
| 7,626,952 | B2 | 12/2009 | Slemmer et al. |
| 7,664,233 | B1 | 2/2010 | Kirchmeier et al. |
| 7,684,548 | B1 | 3/2010 | Rodkey et al. |
| 7,685,245 | B1 | 3/2010 | Rodkey et al. |
| 7,685,265 | B1 | 3/2010 | Nguyen et al. |
| 7,769,495 | B1 | 8/2010 | Rodkey et al. |
| 7,769,496 | B1 | 8/2010 | Rodkey et al. |
| 7,769,611 | B1 | 8/2010 | Rodriguez et al. |
| 7,773,729 | B2 | 8/2010 | Rodkey et al. |
| 7,808,378 | B2 | 10/2010 | Hayden |
| 7,853,250 | B2 | 12/2010 | Harvey et al. |
| 7,869,576 | B1 | 1/2011 | Rodkey et al. |
| 7,877,694 | B2 | 1/2011 | Antonelli et al. |
| 7,895,263 | B1 | 2/2011 | Kirchmeier et al. |
| 7,904,208 | B1 | 3/2011 | Rodkey et al. |
| 7,937,655 | B2 | 5/2011 | Teng et al. |
| 8,023,621 | B2 | 9/2011 | Hulls |
| 8,051,168 | B1 | 11/2011 | Boysko et al. |
| 2001/0018718 | A1 | 8/2001 | Ludtke et al. |
| 2001/0046234 | A1 | 11/2001 | Agrawal et al. |
| 2002/0035607 | A1 | 3/2002 | Checkoway et al. |
| 2002/0072348 | A1 | 6/2002 | Wheeler et al. |
| 2002/0072966 | A1 | 6/2002 | Eldering et al. |
| 2002/0091789 | A1 | 7/2002 | Katariya et al. |
| 2002/0103850 | A1 | 8/2002 | Moyer et al. |
| 2002/0103898 | A1 | 8/2002 | Moyer et al. |
| 2002/0111855 | A1 | 8/2002 | Hammerstad |
| 2002/0112073 | A1 | 8/2002 | MeLampy et al. |
| 2002/0116336 | A1 | 8/2002 | Diacakis et al. |
| 2002/0116393 | A1 | 8/2002 | Goldstein et al. |
| 2002/0120760 | A1 | 8/2002 | Kimchi et al. |
| 2002/0169839 | A1 | 11/2002 | Goldberg |
| 2002/0184521 | A1 | 12/2002 | Lucovsky et al. |
| 2003/0009497 | A1 | 1/2003 | Yu |
| 2003/0014297 | A1 | 1/2003 | Kaufman et al. |
| 2003/0018771 | A1 | 1/2003 | Vinberg |
| 2003/0036960 | A1 | 2/2003 | Suzaki et al. |
| 2003/0055829 | A1 | 3/2003 | Kambo et al. |
| 2003/0065874 | A1 | 4/2003 | Marron et al. |
| 2003/0093417 | A1 | 5/2003 | Kagimasa et al. |
| 2003/0119531 | A1 | 6/2003 | Patton et al. |
| 2003/0126250 | A1 | 7/2003 | Jhanji |
| 2003/0135567 | A1 | 7/2003 | Reilly |
| 2003/0187992 | A1 | 10/2003 | Steenfeldt et al. |
| 2003/0193558 | A1 | 10/2003 | Doss et al. |
| 2003/0195698 | A1 | 10/2003 | Jones |
| 2003/0215067 | A1 | 11/2003 | Ordille et al. |
| 2003/0217109 | A1 | 11/2003 | Ordille et al. |
| 2003/0229722 | A1 | 12/2003 | Beyda |
| 2004/0003058 | A1 | 1/2004 | Trossen |
| 2004/0006606 | A1 | 1/2004 | Marotta et al. |
| 2004/0015371 | A1 | 1/2004 | Thomas et al. |
| 2004/0015778 | A1 | 1/2004 | Britton et al. |
| 2004/0028077 | A1 | 2/2004 | Gray et al. |
| 2004/0029625 | A1 | 2/2004 | Annunziata |
| 2004/0029626 | A1 | 2/2004 | Annunziata |
| 2004/0039517 | A1 | 2/2004 | Biesinger et al. |
| 2004/0059705 | A1 | 3/2004 | Wittke et al. |
| 2004/0064387 | A1 | 4/2004 | Clarke et al. |
| 2004/0066925 | A1 | 4/2004 | Rosera et al. |

| | | | |
|---|---|---|---|
| 2004/0095939 | A1* | 5/2004 | Yang ........................ 370/395.52 |
| 2004/0111476 | A1 | 6/2004 | Trossen et al. |
| 2004/0153413 | A1 | 8/2004 | Gross |
| 2004/0162943 | A1 | 8/2004 | Degenaro et al. |
| 2004/0225733 | A1 | 11/2004 | Tesink et al. |
| 2004/0254937 | A1 | 12/2004 | Gernold |
| 2005/0021383 | A1 | 1/2005 | Fliess et al. |
| 2005/0021622 | A1 | 1/2005 | Cullen |
| 2005/0033657 | A1 | 2/2005 | Herrington et al. |
| 2005/0086469 | A1 | 4/2005 | Dunagan et al. |
| 2005/0114401 | A1 | 5/2005 | Conkel |
| 2005/0165743 | A1 | 7/2005 | Bharat et al. |
| 2005/0171958 | A9 | 8/2005 | Cheng et al. |
| 2005/0262016 | A1 | 11/2005 | Hill et al. |
| 2006/0056628 | A1 | 3/2006 | Todd |
| 2006/0067309 | A1 | 3/2006 | Zhakov et al. |
| 2006/0253585 | A1 | 11/2006 | Fein et al. |
| 2007/0168550 | A1 | 7/2007 | Wang et al. |
| 2007/0179828 | A1 | 8/2007 | Elkin et al. |
| 2007/0180490 | A1 | 8/2007 | Renzi et al. |
| 2007/0203741 | A1 | 8/2007 | Ordille et al. |
| 2007/0299685 | A1 | 12/2007 | Marsh |
| 2008/0005278 | A1 | 1/2008 | Betz et al. |
| 2008/0046510 | A1 | 2/2008 | Beauchamp et al. |
| 2008/0249843 | A1 | 10/2008 | Gross |
| 2008/0313003 | A1 | 12/2008 | Racca et al. |
| 2009/0037548 | A1 | 2/2009 | Ordille et al. |
| 2009/0082076 | A1 | 3/2009 | Annunziata |
| 2009/0110159 | A1 | 4/2009 | Kalbag |
| 2009/0110174 | A1 | 4/2009 | Gallant et al. |
| 2009/0201919 | A1 | 8/2009 | Swartz |
| 2009/0204977 | A1 | 8/2009 | Tavares et al. |
| 2009/0235084 | A1 | 9/2009 | Ferraro et al. |
| 2010/0064020 | A1 | 3/2010 | Weyer et al. |
| 2011/0047078 | A1 | 2/2011 | Ginter et al. |

FOREIGN PATENT DOCUMENTS

| | | | |
|---|---|---|---|
| JP | 9185655 | A | 7/1997 |
| JP | 10171729 | A | 6/1998 |
| KR | 20000037554 | A | 7/2000 |
| WO | 0069132 | A1 | 11/2000 |
| WO | 0154008 | A2 | 7/2001 |
| WO | 02093886 | A2 | 11/2002 |
| WO | WO 02/093886 | A | 11/2002 |

OTHER PUBLICATIONS

"EP Application No. 05 251 608.5-2416 Examination Report Mar. 20, 2009", , Publisher: EPO, Published in: EP.

"EP Application No. 05 251 608.5 Examination Report Apr. 6, 2006", , Publisher: EPO, Published in: EP.

Garcia Bolos, R., "EP Application No. 05251608.5 Search Report Jul. 27, 2005", , Publisher: EPO, Published in: EP.

"EP Application No. 05251608.5-2416 / 1585276 Summons Report Sep. 17, 2008", , Publisher: EPO, Published in: EP.

Truong, Lan Dai T., "U.S. Appl. No. 10/999,909 Office Action Nov. 6, 2009", , Publisher: USPTO, Published in: US.

Truong, Lan Dai T., "U.S. Appl. No. 10/999,909 Office Action Apr. 1, 2009", , Publisher: USPTO, Published in: US.

Hu, Jinsong, "U.S. Appl. No. 10/999,891 Notice of Allowance Jan. 13, 2010", , Publisher: USPTO, Published in: US.

Hu, Jinsong, "U.S. Appl. No. 10/999,891 Office Action Apr. 16, 2009", , Publisher: USPTO, Published in: US.

Tarumi et al., "Workflow Implementation with Rule-Based E-mail", "Journal of the Transactions of Information Processing Society of Japan", Jun. 15, 1995, pp. 1322-1331, vol. 36, No. 6, Publisher: Information Processing Society of Japan, Published in: JP.

"EP Application No. 02 731 823.7 Office Action Dec. 23, 2009", , Publisher: EPO, Published in: EP.

Sudo, T., "JP Application No. 2002-590633 Office Action Feb. 23. 2009", , Publisher: JPO, Published in: JP.

Won-Ho Gye, "KR Application No. 10-2003-7014910 Office Action Jan. 14, 2010", , Publisher: KIPO, Published in: KR.

Kim, Paul, "U.S. Appl. No. 10/999,890 Office Action Dec. 27, 2007", , Publisher: USPTO, Published in: US.

Kim, Paul, "U.S. Appl. No. 10/999,890 Office Action Feb. 1, 2007", , Publisher: USPTO, Published in: US.

Kim, Paul, "U.S. Appl. No. 10/999,890 Office Action May 11, 2007", , Publisher: USPTO, Published in: US.

Kim, Paul, "U.S. Appl. No. 10/999,890 Office Action Aug. 17, 2007", , Publisher: USPTO, Published in: US.

Kim, Paul, "U.S. Appl. No. 10/999,890 Office Action Aug. 29, 2008", , Publisher: USPTO, Published in: US.

Truong, Lan Dai T., "U.S. Appl. No. 10/999,909 Office Action Feb. 6, 2009", , Publisher: USPTO, Published in: US.

Truong, Lan Dai T., "U.S. Appl. No. 10/999,909 Office Action Jun. 9, 2008", , Publisher: USPTO, Published in: US.

Porter, William Ernest, "U.S. Appl. No. 11/083,070 Office Action Aug. 6, 2009", , Publisher: USPTO, Published in: US.

Hu, Jinsong, "U.S. Appl. No. 10/999,891 Office Action Mar. 14, 2008", , Publisher: USPTO, Published in: US.

Sudo, T., "JP Application No. 2002-590633 Office Action Feb. 23, 2009", , Publisher: JPO, Published in: JP.

Kim, Paul, "U.S Appl. No. 10/999,890 Office Action Feb. 1, 2007", , Publisher: USPTO, Published in: US.

Lennox et al., "CPL: A Language for User Control of Internet Telephony Services", Nov. 14, 2000, pp. 1-64, Publisher: Internet Engineering Task Force.

Rosenberg et al., "The Heart of Wireless UC Control: Communications Personalization", "The Unified-View", 2000-2001, pp. 1-5.

Cardelli et al., "Service Combinators for Web Computing", "IEEE Transactions on Software Engineering", , pp. 309-316, vol. 25, No. 3.

Miklos, Zoltan, "Towards an Access Control Mechanism for Wide-area Publish/Subscribe Systems".

Dalgic et al., "True Number Portability and Advanced Call Screening in a SIP-Based IP Telephony System", "IEEE Communications Magazine XP000835310", Jul. 1999, pp. 96-101, vol. 37, No. 7, Publisher: IEEE.

Dinardo, Carla, "CA Application No. 2,447,436 Office Action Jun. 13, 2008", , Publisher: CIPO, Published in: CA.

"EP Application No. 02731823.7 Office Action Nov. 28, 2008", , Publisher: EPO, Published in: EP.

K. Tauchi, "JP Application No. 2002-590633 Office Action Jan. 7, 2008", , Publisher: JPO, Published in: JP.

Sudo, T., "JP Application No. 2002-590633 Office Action Sep. 28, 2009", , Publisher: JPO, Published in: JP.

Won-Ho Gye, "KR Application No. 10-2003-7014910 Office Action Aug. 17, 2009", , Publisher: KIPO, Published in: KR.

Won-Ho Gye, "KR Application No. 10-2003-7014910 Preliminary Rejection Nov. 10, 2008", , Publisher: KIPO, Published in: KR.

Platzer, C., "PCT Application No. PCT/US 02/15513 International Search Report Apr. 28, 2003", , Publisher: PCT, Published in: PCT.

Ismail, Shawki S., "PCT Application No. PCT/US 02/15513 Office Action Jan. 26, 2010", , Publisher: PCT, Published in: PCT.

Reddy, Jacinta, "PCT Application No. PCT/US2002/15513 Partial International Search Report Feb. 3, 2003", , Publisher: PCT, Published in: PCT.

Truong, Lan Dai T., "U.S. Appl. No. 10/184,236 Advisory Action Feb. 13, 2007", , Publisher: USPTO, Published in: IS.

Truong, Lan Dai T., "U.S. Appl. No. 10/184,236 Examiner's Answer Brief Sep. 3, 2009", , Publisher: USPTO, Published in: US.

Truong, Lan Dai T., "U.S. Appl. No. 10/184,236 Office Action Mar. 10, 2006", , Publisher: USPTO, Published in: US.

Truong, Lan Dai T., "U.S. Appl. No. 10/184,236 Office Action Aug. 11, 2005", , Publisher: USPTO, Published in: US.

Truong, Lan Dai T., "U.S. Appl. No. 10/184,236 Office Action Sep. 1, 2006", , Publisher: USPTO, Published in: US.

Truong, Lan Dai T., "U.S. Appl. No. 12/243,442 Office Action Jun. 15, 2010", , Publisher: USPTO, Published in: US.

Truong, Lan Dai T., "U.S. Appl. No. 10/999,909 Office Action Oct. 15, 2010", , Publisher: USPTO, Published in: US.

Truong, Lan Dai T., "U.S. Appl. No. 10/999,909 Office Action Apr. 29, 2010", , Publisher: USPTO, Published in: US.

Porter, William Ernest, "U.S. Appl. No. 11/083,070 Office Action Oct. 28, 2010", , Publisher: USPTO, Published in: US.

Porter, William Ernest, "U.S. Appl. No. 11/083,070 Office Action Aug. 3, 2010", , Publisher: USPTO, Published in: US.

Truong, Lan Dai T., "U.S. Appl. No. 11/743,994 Office Action Nov. 25, 2009", , Publisher: USPTO, Published in: US.

Truong, Lan Dai T., "U.S. Appl. No. 11/743,994 Office Action Apr. 7, 2009", , Publisher: USPTO, Published in: US.
Hu, Jinsong, "U.S. Appl. No. 10/999,891 Office Action Jul. 9, 2009", , Publisher: USPTO, Published in: US.
Cardelli et al., "Service Combinators for Web Computing", , "IEEE Transactions on Software Engineering", pp. 309-316, vol. 25, No. 3.
"EP Application No. 05251607.7 Office Action Oct. 2, 2006", , Publisher: EPO, Published in: EP.
"EP Application No. 05251607.7 Office Action Apr. 18, 2006", , Publisher: EPO, Published in: EP.
"EP Application No. 05251607.7 Decision to Refuse Sep. 24, 2008", , Publisher: EPO, Published in: EP.
Garcia Bolos, R., "EP Application No. 05251607.7 European Search Report Jul. 27, 2005", , Publisher: EPO, Published in: EP.
Garcia Bolos, R., "EP Application No. 05251607.7 Summons to Oral Proceedings Feb. 15, 2008", , Publisher: EPO, Published in: EP.
Porter, William Ernest, "U.S. Appl. No. 11/083,070 Office Action Mar. 3, 2010", , Publisher: USPTO, Published in: US.
Truong, Lan Dai T., "U.S. Appl. No. 12/243,442 Office Action Nov. 22, 2010", , Publisher: USPTO, Published in: US.
Truong, Lan Dai T., "U.S. Appl. No. 12/243,442 Restriction Requirement Feb. 3, 2011", , Publisher: USPTO, Published in: US.
Porter, William Ernest, "U.S. Appl. No. 11/083,070 Office Action Mar. 31, 2011", , Publisher: USPTO, Published in: US.
Kim, Paul, "U.S. Appl. No. 12/243,416 Office Action Apr. 28, 2011", , Publisher: USPTO, Published in: US.
Kim, Paul, "U.S. Appl. No. 12/243,416 Office Action Feb. 23, 2011", , Publisher: USPTO, Published in: US.
Dinardo, Carla, "CA Application No. 2,447,436 Office Action Feb. 3, 2011", , Publisher: CIPO, Published in: CA.
Truong, Lan Dai T., "U.S. Appl. No. 12/243,442 Office Action Jun. 7, 2011", , Publisher: USPTO, Published in: US.
Truong, Lan Dai T., "U.S. Appl. No. 10/999,909 Office Action Jun. 15, 2011", , Publisher: USPTO, Published in: US.
EP App. No. 02731823.7 Office Action Nov. 28, 2008.
EP App. No. 05251609.3 Office Action Jan. 23, 2008.
EP App. No. 05251609.3 Office Action Aug. 29, 2006.
EP App. No. 05251632.5 Office Action Oct. 2, 2006.
EP App. No. 05251632.5 Office Action Apr. 11, 2006.
EP App. No. 05251633.3 Office Action Oct. 2, 2006.
EP App. No. 05251633.3 Office Action Apr. 6, 2006.
Garcia Bolos R, EP App. No. 05251608.5 Decision to Refuse Mar. 20, 2009.
Garcia Bolos R, EP App. No. 05251609.3 European Search Report Jul. 27, 2005.
Kim P, U.S. Appl. No. 10/999,890 Interview Summary Apr. 11, 2008.
Mcconnell S, "Who Needs Software Engineering?," IEEE Software Jan. 2001.
Rosenberg et al., "SIP: Session Initiation Protocol," RFC 3261, Jun. 2002.
Sudo T, JP App. No. 2002-590633 Office Action Feb. 9, 2009.
Tanenbaum A, Structured computer organization, 2nd ed., Prentice-Hall 1984.
Tauchi K, JP App. No. 2002-590633 Office Action Jan. 9, 2008.
Vahid F, "The Softening of Hardware," Computer Apr. 2003.
Won-Hog, KR App. No. 10-2003-7014910 Office Action Nov. 10, 2008.
Lennox et al., "CPL: A Language for User Control of Internet Telephony Services", Nov. 21, 2001.
Lennox et al., "CPL: A Language for User Control of Internet Telephony Services", 11114/2000, pp. 164, Publisher: Internet Engineering Task Force.
Rosenberg et al., "The Heart of Wireless UC Control: Communications Personalization", "The Unified-View", 2000-2001, pp. 15.
Murata et al., "Integrating routing and resource reservation mechanisms in real-time multicast protocols", "Proceedings of the 16th IEEE International Conference on Distributed Computing Systems XP010167618", May 27, 1996, pp. 141-148, Publisher: IEEE Computer Society.

Schulzrinne et al., "Sip Caller Preferences and Callee Capabilities", "Internet Draft, Columbia University", Nov. 2000, Publisher: Internet Engineering Task Force, Published in: US.
Wang et al., "Security Issues and Requirements for Internet-Scale Publish-Subscribe Systems", "Proceedings of the 35th Hawaii International Conference on System Sciences", Sep. 2002, Publisher: IEEE.
Cardelli et al., "Service Combinators for Web Computing", "IEEE Transactions on Software Engineering", p. (s) 309-316, vol. 25, No. 3 May 1999.
Handley et al., "SIP: Session Initiation Protocol", "Network Working Group", Mar. 1999, pp. 1-153.
Miklos, Zoltan, "Towards an Access Control Mechanism for Wide-area Publish/Subscribe Systems", Jul. 2002.
Dalgic et al., "True No. Portability and Advanced Call Screening in a SIP-Based I Telephony System", "IEEE Communications Magazine XP000835310", Jul. 1999, pp. 96-101, vol. 37, No. 7, Publisher: IEEE.
"Wireless Access Protocol (WAP) 1.2.1", "http://www.wapforum.org/what/technical_1_2_1.htm", Jun. 2000, Publisher: WAP Forum Jun. 2000 (WAP 1.2.1) Specifications.
Dinardo, Carla, "CA Application No. 2,447,436 Office Action Jun. 13, 2008", Publisher: CIPO, Published in: CA.
"EP Application No. 02731823.7 Office Action Nov. 28, 2008" Publisher: EPO, Published in: EP.
K. Tauchi, "JP Application No. 2002-590633 Office Action Jan. 7, 2008", Publisher: JPO, Published in: JP.
Sudo, T., "JP Application No. 2002-590633 Office Action Sep. 28, 2009", Publisher: JPO, Published in: JP.
Won-Ho Gye, "KR Application No. 10-2003-7014910 Office Action Aug. 17, 2009" Publisher: KIPO, Published in: KR.
Won-Ho Gye, "KR Application No. 10-2003-7014910 Preliminary Rejection Nov. 10, 2008" Publisher: KIPO, Published in: KR.
Platzer, C., "PCT Application No. PCT/US 02/15513 International Search Report Apr. 28, 2003", Publisher: PCT, Published in: PCT.
Ismail, Shawki S., "PCT Application No. PCT/US 02/15513 Office Action Jan. 26, 2010" Publisher: PCT, Published in: PCT.
Reddy, Jacinta, "PCT Application No. PCT/US2002/15513 Partial International Search Report Feb. 3, 2003" Publisher: PCT, Published in: PCT.
Truong, Lan Dai T., "U.S. Appl. No. 10/184,236 Advisory Action Feb. 13, 2007", Publisher: USPTO, Published in: IS.
Truong, Lan Dai T., "U.S. Appl. No. 10/184,236 Examiner's Answer Brief Sep. 3, 2009", Publisher: USPTO, Published in: US.
Truong, Lan Dai T., "U.S. Appl. No. 10/184,236 Office Action Mar. 10, 2006", Publisher: USPTO, Published in: US.
Truong, Lan Dai T., "U.S. Appl. No. 10/184,236 Office Action Aug. 11, 2005", Publisher: USPTO, Published in: US.
Truong, Lan Dai T., "U.S. Appl. No. 10/184,236 Office Action Sep. 11, 2006" Publisher: USPTO, Published in: US.
Truong, Lan Dai T., "U.S. Appl. No. 12/243,442 Office Action Jun. 15, 2010", Publisher: USPTO, Published in: US.
Truong, Lan Dai T., "U.S. Appl. No. 10/999,909 Office Action Oct. 15, 2010", Publisher: USPTO, Published in: US.
Truong, Lan Dai T., "U.S. Appl. No. 10/999,909 Office Action Apr. 29, 2010", Publisher: USPTO, Published in: US.
Porter, William Ernest, "U.S. Appl. No. 11/083,070 Office Action Oct. 28, 2010" Publisher: USPTO, Published in: US.
Porter, William Ernest, "U.S. Appl. No. 11/083,070 Office Action Aug. 3, 2010" Publisher: USPTO, Published in: US.
Truong, Lan Dai T., "U.S. Appl. No. 11/743,994 Office Action Nov. 25, 2009", Publisher: USPTO, Published in: US.
Truong, Lan Dai T., "U.S. Appl. No. 11/743,994 Office Action Apr. 7, 2009", Publisher: USPTO, Published in: US.
Hu, Jinsong, "U.S. Appl. No. 10/999,891 Office Action Jul. 9, 2009" Publisher: USPTO, Published in: US.

* cited by examiner

FIG. 2A

PRIMITIVE TABLE – 200

| OPERATOR | TYPE | BINARY | LIST | RELATED OPERATOR | TRUTH TABLE | EXAMPLE(S) |
|---|---|---|---|---|---|---|
| ADVISES | SEQ. | X | | INFORMS | FIG. 3A | JOHN ADVISES JANE - JOHN'S RESPONSE TRIGGERS NOTIFICATION TO JANE<br><br>JOHN ADVISES BROADCAST {JANE, FRED}- JOHN'S RESPONSE TRIGGERS NOTIFICATION TO JANE AND FRED |
| AFTER | TIME | | | | FIG. 3B | (JOHN RACES JANE) AFTER + 1:00- JOHN AND JANE ARE CONTACTED IN PARALLEL ONE HOUR FROM NOW<br><br><WORK PHONE> AFTER + '<WORK HOURS>' 1:00- CONTACT THE USER VIA 'WORK PHONE' AFTER ONE HOUR DURING 'WORK HOURS'<br><br>JOHN AFTER START ('5 MAY 2004') + 10:00- CONTACT JOHN AFTER 10 HOURS ON MAY 5, 2004. IF THE CURRENT TIME IS AFTER 10 AM ON MAY 5, 2004, OR IS ON A DAY AFTER THAT DATE, THEN JOHN IS CONTACTED IMMEDIATELY. |

Column labels: 210, 220, 230, 240, 250, 260, 270

FIG. 2B

| OPERATOR | TYPE | BINARY | LIST | RELATED OPERATOR | TRUTH TABLE | EXAMPLE(S) |
|---|---|---|---|---|---|---|
| AND | PAR. | X | X | ANDTHEN | FIG. 3C | JOHN AND JANE - JOHN AND JANE ARE CONTACTED IN PARALLEL, THE FIRST TO RESPOND "NO" CANCELS THE NOTIFICATION TO THE OTHER.<br><br>JOHN AND JANE AND FRED- JOHN, JANE AND FRED ARE CONTACTED IN PARALLEL, THE FIRST TO RESPOND "NO" CANCELS THE NOTIFICATION TO THE OTHERS.<br><br>AND {JOHN, JANE, FRED}- JOHN, JANE AND FRED ARE CONTACTED IN PARALLEL, THE FIRST TO RESPOND "NO" CANCELS THE NOTIFICATION TO THE OTHERS. |
| ANDTHEN | SEQ. | X | X | AND | FIG. 3D | JOHN ANDTHEN JANE- CONTACT JANE IF JOHN SAYS "YES"<br><br>JOHN ANDTHEN JANE ANDTHEN FRED- CONTACT FRED IF JOHN AND JANE SAY "YES"<br><br>ANDTHEN {JOHN, JANE, FRED}- CONTACT FRED IF JOHN AND JANE SAY "YES" |

FIG. 2C

| OPERATOR | TYPE | BINARY | LIST | RELATED OPERATOR | TRUTH TABLE | EXAMPLE(S) |
|---|---|---|---|---|---|---|
| BROADCAST | PAR. | | X | SURVEY | FIG. 3E | BROADCAST {JOHN, JANE, FRED}- CONTACT JOHN, JANE AND FRED IN PARALLEL AND WAIT FOR THEM ALL TO RESPOND<br><br>BROADCAST {JOHN ANDTHEN JANE, FRED}- CONTACT JOHN AND FRED IN PARALLEL, ONLY CONTACT JANE IF JOHN SAYS "YES", WAIT FOR ALL CONTACTED PARTIES TO RESPOND |
| CONSULT | PAR. | | X | | FIG. 3F | CONSULT {JOHN, JANE, FRED}- NOTIFY JOHN, JANE AND FRED, USE THE FIRST RESPONSE AND ALLOW THE OTHERS TO COMMENT. |
| DELEGATES | SEQ. | X | | RACES | FIG. 3G | JOHN DELEGATES JANE- IF JOHN CAN'T BE REACHED, THEN CONTACT JANE<br><br>JOHN DELEGATES JANE DELEGATES FRED- IF JOHN OR JANE CAN'T BE REACHED, THEN CONTACT FRED<br><br>DELEGATES {JOHN, JANE, FRED}- IF JOHN OR JANE CAN'T BE REACHED, THEN CONTACT FRED |

FIG. 2D

| OPERATOR (210) | TYPE (220) | BINARY (230) | LIST (240) | RELATED OPERATOR (250) | TRUTH TABLE (260) | EXAMPLE(S) (270) |
|---|---|---|---|---|---|---|
| DURING | TIME | | | | FIG. 3H | <WORK TELEPHONE> DURING '<WORK HOURS>'- IF IT IS CURRENTLY WITHIN MY WORK HOURS, THEN CALL ME AT WORK, OTHERWISE WAIT UNTIL IT IS MY WORK HOURS AND THEN PLACE THE CALL.<br><br><HOME TELEPHONE> DURING '4 JUL 2004'- IF IT IS JULY 4th, I'M NOT GOING TO BE AT WORK, SO CALL ME AT HOME.<br><br><CELL PHONE> DURING '<VACATION>'- IF IT IS DURING MY VACATION, CALL ME ON MY CELL PHONE, OTHERWISE WAIT UNTIL IT IS MY VACATION AND CALL ME. IF MY VACATION HAS PASSED BEFORE THE NOTIFICATION, THEN DON'T CALL ME. ONCE I HAVE BEEN CONTACTED, THE CONTACT REMAINS ACTIVE EVEN AFTER MY VACATION HAS ENDED.<br><br>JOHN DURING '08:00'- THIS WOULD BLOCK ALL CONTACT TO JOHN UNTIL 8AM, AT WHICH TIME HE WOULD RECEIVE EVERYTHING. |

*FIG. 2E*

| OPERATOR | TYPE | BINARY | LIST | RELATED OPERATOR | TRUTH TABLE | EXAMPLE(S) |
|---|---|---|---|---|---|---|
| FROM-TO | TIME | | | | FIG. 3I | <CELL PHONE><br>FROM START('<VACATION>')<br>TO END('<VACATION>') -<br>WHEN MY VACATION HAS STARTED AND NOT YET ENDED, THEN CONTACT ME ON MY 'CELL PHONE'. IF I WAS CONTACTED VIA 'CELL PHONE,' HAVE NOT RESPONDED BEFORE THE END OF MY VACATION, AND MY VACATION ENDS, THEN CANCEL THE NOTIFICATION TO MY 'CELL PHONE' CONTACT. |
| IF-THEN-ELSE | COND. | | | | FIG. 3J | IF JOHN THEN JANE ELSE FRED-<br>IF JOHN SAYS "YES" THEN CONTACT JANE, IF JOHN SAYS "NO" OR CAN'T BE REACHED, CONTACT FRED.<br><br>IF JOHN THEN TRUE ELSE FRED-<br>IF JOHN SAYS "NO" OR CAN'T BE REACHED, CONTACT FRED, OTHERWISE RETURN JOHN'S "YES".<br><br>IF ? LABEL('OUTOFBAND')?<br>THEN <MAIL> ELSE <TELEPHONE>-<br>IF I RECEIVED THIS REQUEST OUT-OF-BAND, THEN SEND ME EMAIL, OTHERWISE CALL ME. |

FIG. 2F

| OPERATOR | TYPE | BINARY | LIST | RELATED OPERATOR | TRUTH TABLE | EXAMPLE(S) |
|---|---|---|---|---|---|---|
| INFORMS | PAR. | X | | ADVISES | FIG. 3K | JOHN INFORMS JANE- NOTIFY JOHN AND JANE IN PARALLEL, BUT JANE'S RESPONSE DOES NOT AFFECT THE COMMUNICATION FLOW.<br><br>JOHN INFORMS BROADCAST {JANE, FRED}- NOTIFY JOHN, JANE AND FRED IN PARALLEL, BUT ONLY JOHN'S RESPONSE AFFECTS THE COMMUNICATION FLOW. |
| NOT | NEGATION | | | | FIG. 3L | (NOT JOHN) ANDTHEN JANE- CONTACT JANE ONLY IF JOHN SAYS "NO" |
| OR | PAR. | X | X | ORELSE | FIG. 3M | JOHN OR JANE- CONTACT JOHN AND JANE IN PARALLEL, THE FIRST TO RESPOND "YES" CANCELS THE NOTIFICATION TO THE OTHER.<br><br>JOHN OR JANE OR FRED- CONTACT JOHN, JANE AND FRED IN PARALLEL, THE FIRST TO RESPOND "YES" CANCELS THE NOTIFICATION TO THE OTHERS.<br><br>OR {JOHN, JANE, FRED}- CONTACT JOHN, JANE AND FRED IN PARALLEL, THE FIRST TO RESPOND "YES" CANCELS THE NOTIFICATION TO THE OTHERS. |

FIG. 2G

| OPERATOR | TYPE | BINARY | LIST | RELATED OPERATOR | TRUTH TABLE | EXAMPLE(S) |
|---|---|---|---|---|---|---|
| ORELSE | SEQ. | X | X | OR | FIG. 3N | JOHN ORELSE JANE- CONTACT JANE ONLY IF JOHN SAYS "NO"<br><br>JOHN ORELSE JANE ORELSE FRED- CONTACT FRED ONLY IF BOTH JOHN AND JANE SAY "NO"<br><br>ORELSE {JOHN, JANE, FRED}- CONTACT FRED ONLY IF BOTH JOHN AND JANE SAY "NO" |
| POLLS | SEQ. | | X | VOTES | FIG. 3O | {JOHN, JANE, FRED} POLLS 2- JOHN, JANE AND FRED ARE NOTIFIED IN ORDER. AS SOON AS TWO SAY "YES" THE OPERATOR EVALUATES TO TRUE. IF TWO SAY "NO", THEN THE VALUE IS FALSE. IF ONE USER CAN'T BE CONTACTED, ONE ANSWERS "YES" AND THE LAST ANSWERS "NO", THEN MAYBE IS THE RESULT. IF MORE THAN ONE CAN'T BE REACHED, THEN MAYBE IS ALSO THE RESULT.<br><br>{JOHN, JANE, FRED} POLLS 50%- SAME AS PREVIOUS EXAMPLE (50% OF 3 IS 1.5, ROUND TO 2) |

FIG. 2H

| OPERATOR | TYPE | BINARY | LIST | RELATED OPERATOR | TRUTH TABLE | EXAMPLE(S) |
|---|---|---|---|---|---|---|
| RACES | PAR. | X | X | DELEGATES | FIG. 3P | JOHN RACES JANE- JOHN AND JANE ARE CONTACTED IN PARALLEL, THE FIRST TO RESPOND EITHER "YES" OR "NO" CANCELS THE NOTIFICATION TO THE OTHER<br><br>JOHN RACES JANE RACES FRED- JOHN, JANE AND FRED ARE CONTACTED IN PARALLEL, THE FIRST TO RESPOND EITHER "YES" OR "NO" CANCELS THE NOTIFICATION TO THE OTHERS.<br><br>RACES {JOHN, JANE, FRED}- JOHN, JANE AND FRED ARE CONTACTED IN PARALLEL, THE FIRST TO RESPOND EITHER "YES" OR "NO" CANCELS THE NOTIFICATION TO THE OTHERS. |
| SURVEY | SEQ. | | X | BROADCAST | FIG. 3Q | SURVEY {JOHN, JANE, FRED}- CONTACT JOHN, ONCE JOHN HAS RESPONDED, CONTACT JANE, ONCE JANE HAS RESPONDED, CONTACT FRED |
| UNTIL | TIME | | | | FIG. 3R | JOHN UNTIL + 1:00- CONTACT JOHN, IF JOHN HAS NOT RESPONDED WITHIN ONE HOUR, THEN CANCEL THE NOTIFICATION TO JOHN AND INDICATE THAT JOHN COULD NOT BE REACHED. |

FIG. 21

| OPERATOR | TYPE | BINARY | LIST | RELATED OPERATOR | TRUTH TABLE | EXAMPLE(S) |
|---|---|---|---|---|---|---|
| VOTES | PAR. | | X | POLLS | FIG. 3S | {JOHN, JANE, FRED} VOTES 2- CONTACT JOHN, JANE AND FRED IN PARALLEL. AS SOON AS TWO RESPOND "YES", CANCEL THE NOTIFICATION TO THE THIRD AND RETURN TRUE. IF TWO RESPOND "NO", CANCEL THE NOTIFICATION TO THE THIRD AND RETURN FALSE. IF ONE RECIPIENT CAN'T BE REACHED, ONE SAYS "YES" AND ONE SAYS "NO", THEN THIS OPERATOR RESULTS IN A MAYBE. IF MORE THAN ONE USER CAN'T BE REACHED, THEN THE OPERATOR ALSO RESULTS IN A MAYBE.<br><br>{JOHN, JANE, FRED} VOTES 50%- SAME AS PREVIOUS EXAMPLE. |

FIG. 2J

| OPERATOR | TYPE | BINARY | LIST | RELATED OPERATOR | TRUTH TABLE | EXAMPLE(S) |
|---|---|---|---|---|---|---|
| WHEN | COND. | | | | FIG. 3T | WHEN JOHN ISTRUE JANE ISFALSE FALSE ISMAYBE MAYBE- EQUIVALENT TO JOHN ANDTHEN JANE<br><br>WHEN JOHN ISTRUE JANE- EQUIVALENT TO JOHN ANDTHEN JANE<br><br>WHEN JOHN ISMAYBE JANE- EQUIVALENT TO JOHN DELEGATES JANE<br><br>WHEN JOHN ISFALSE JANE- EQUIVALENT TO JOHN ORELSE JANE<br><br>WHEN JOHN ISTRUE JANE ISFALSE FRED ISMAYBE FRED- EQUIVALENT TO IF JOHN THEN JANE ELSE FRED<br><br>WHEN JOHN UNTIL + 1:00<br>   ISMAYBE RACES {JOHN, JANE}<br>   ISFALSE JANE-<br>CONTACT JANE IF JOHN EITHER DOES NOT RESPOND WITHIN ONE HOUR, OR RESPONDS "NO". IF JOHN DOES NOT RESPOND WITHIN AN HOUR, JOHN WILL ALSO BE CONTACTED AGAIN. IF JOHN RESPONDS "YES" AT ANY TIME, THEN THE OPERATOR RESULTS IN TRUE. |

FIG. 3B

AFTER TRUTH TABLE

IF THE TIME_EXPRESSION CONTAINS A TIME_DOMAIN THAT IS EMPTY, OR AN ERROR IS GENERATED WHILE EVALUATING THE EXPRESSION, THEN AFTER AUTOMATICALLY RESULTS IN A MAYBE. OTHERWISE, AFTER ALWAYS GENERATES A NORESULT VALUE PRIOR TO THE TIME OF EXECUTION AND THEN REPLACES ITSELF WITH ITS CHILD EXPRESSION WHEN THE TIME IS REACHED.

FIG. 3A

| ADVISES | RIGHT | | |
|---|---|---|---|
| | F | X | T |
| LEFT F | F | F | F |
| X | X | X | X |
| T | T | T | T |

FIG. 3C

| AND | RIGHT | | |
|---|---|---|---|
| | F | X | T |
| LEFT F | F | F | F |
| X | F | X | X |
| T | F | X | T |

FIG. 3D

| ANDTHEN | RIGHT | | |
|---|---|---|---|
| | F | X | T |
| LEFT F | F | F | F |
| X | X | X | X |
| T | F | X | T |

FIG. 3F

CONSULT TRUTH TABLE

CONSULT EVALUATES TO NORESULT UNTIL ONE OF ITS CHILDREN HAS EVALUATED TO A TRUTH-VALUE OF TRUE OR FALSE, IT THEN RETURNS THAT RESULT PLACING THE REST OF ITS CHILDREN OUT-OF-BAND. IF ALL OF ITS CHILDREN RESULT IN A TRUTH-VALUE OF MAYBE, THEN CONSULT RESULTS IN MAYBE.

FIG. 3H

DURING TRUTH TABLE

IF TIME_DOMAIN IS EMPTY, THERE IS AN ERROR PROCESSING TIME_DOMAIN, OR THE CURRENT TIME IS AFTER THE LAST INTERVAL IN THE TIME_DOMAIN, THEN DURING WILL GENERATE A MAYBE. OTHERWISE IT REPLACES ITSELF WITH ITS CHILD EXPRESSION ONCE THE CURRENT TIME IS IN THE TIME DOMAIN AND THE RESULTING VALUE WILL BE THE VALUE FOR THAT EXPRESSION.

FIG. 3E

BROADCAST TRUTH TABLE

BROADCAST EVALUATES TO NORESULT UNTIL ALL OF ITS CHILDREN HAVE EVALUATED TO A TRUTH-VALUE (TRUE, FALSE, OR MAYBE) AND THEN IT EVALUATES TO TRUE.

FIG. 3G

| DELEGATES | | RIGHT | |
|---|---|---|---|
| | F | X | T |
| F | F | F | F |
| LEFT X | F | X | T |
| T | T | T | T |

FIG. 3I

FROM-TO TRUTH TABLE

IF *TIME_EXPRESSION1* CONTAINS A *TIME_DOMAIN* THAT IS EMPTY OR AN ERROR IS GENERATED WHILE PROCESSING A *TIME_EXPRESSION*, THEN *FROM-TO* AUTOMATICALLY RESULTS IN A *MAYBE*. THIS OPERATOR RESULTS IN A *NORESULT* VALUE AS LONG AS THE *FROM* TIME HAS NOT BEEN REACHED. ONCE EVALUATION OF THE EXPRESSION HAS BEGUN, THEN THE RESULT OF THE EXPRESSION IS RETURNED. IF THE EXPRESSION GENERATES A RESULT OTHER THAN *NORESULT*, THEN THE *TO* TIME IS CANCELED AND THAT VALUE IS USED AS THE VALUE OF THE OPERATOR. IF THE *TO* TIME IS REACHED, THEN THE COMMUNICATION FLOW IS CANCELED AND *MAYBE* IS THE RESULT OF THE OPERATOR.

FIG. 3J

|    |   | THEN/ELSE | | | | | | | | |
|----|---|-----|-----|-----|-----|-----|-----|-----|-----|-----|
|    |   | F/F | F/X | F/T | X/F | X/X | X/T | T/F | T/X | T/T |
|    | F | F | X | T | F | X | T | F | X | T |
| IF | X | F | X | T | F | X | T | F | X | T |
|    | T | F | F | F | X | X | X | T | T | T |

FIG. 3K

| INFORMS | RIGHT F | X | T |
|---|---|---|---|
| LEFT F | F | F | F |
| X | X | X | X |
| T | T | T | T |

FIG. 3L

| NOT | F | X | T |
|---|---|---|---|
|  | T | X | F |

FIG. 3M

| OR | RIGHT F | X | T |
|---|---|---|---|
| LEFT F | F | X | T |
| X | X | X | T |
| T | T | T | T |

FIG. 3N

| ORELSE | RIGHT F | X | T |
|---|---|---|---|
| LEFT F | F | X | T |
| X | X | X | X |
| T | T | T | T |

FIG. 3P

POLLS TRUTH TABLE

|  RACES  | RIGHT F | RIGHT X | RIGHT T |
|---|---|---|---|
| LEFT F | F | F | F |
| LEFT X | F | X | T |
| LEFT T | T | T | T |

FIG. 3O

POLLS TRUTH TABLE

POLLS GENERATES A MAYBE RESULT IF IT DETERMINES AT ANY TIME THAT IT IS NOT POSSIBLE TO GENERATE A TRUE OR FALSE WITH THE REMAINING EXPRESSIONS IT HAS TO EVALUATE. IT WILL ALSO EVALUATE TO TRUE AS SOON AS THE NUMBER (OR PERCENTAGE) IS REACHED, OR FALSE AS SOON AS THERE ARE ENOUGH FALSE VALUES TO PREVENT THE EXPRESSION FROM RETURNING TRUE.

FIG. 3R

UNTIL TRUTH TABLE

WHEN THE TIME IS REACHED, THE CHILD COMMUNICATION FLOW IS CANCELED AND THIS OPERATOR RESULTS IN A MAYBE. IF THE CHILD FLOW COMPLETES WITH A TRUTH-VALUE FIRST, THEN THE UNTIL IS CANCELED AND THE CHILD'S TRUTH-VALUE IS PASSED ON AS THE RESULT OF THE OPERATOR.

FIG. 3Q

SURVEY TRUTH TABLE

SURVEY EVALUATES TO NORESULT UNTIL ALL OF ITS CHILDREN HAVE EVALUATED TO A TRUTH-VALUE (TRUE, FALSE, OR MAYBE) AND THEN IT EVALUATES TO TRUE.

FIG. 3S

VOTES TRUTH TABLE

| |
|---|
| *VOTES* GENERATES A *MAYBE* RESULT IF IT DETERMINES AT ANY TIME THAT IT IS NOT POSSIBLE TO GENERATE A *TRUE* OR *FALSE* WITH THE REMAINING EXPRESSIONS. IT WILL ALSO EVALUATE TO *TRUE* AS SOON AS THE NUMBER (OR PERCENTAGE) IS REACHED, OR *FALSE* AS SOON AS THERE ARE ENOUGH *FALSE* VALUES TO PREVENT THE EXPRESSION FROM RETURNING *TRUE*. |

FIG. 3T

WHEN TRUTH TABLE

| |
|---|
| THIS OPERATOR CAN BE USED TO CREATE A TRUTH TABLE FOR A NEW SEQUENTIAL "OPERATOR". EACH OF THE LIST OPERATORS WITH A BINARY FORM (*ANDTHEN*, *DELEGATES*, *ORELSE*) CAN BE CREATED WITH THIS OPERATOR, AS WELL AS THE TERNARY OPERATOR *IF-THEN-ELSE*. |

FIG. 4

1. ⇧⇩ Subscription 55027102 (Company One High Severity), using [7x24 Profile ▼] Status: [Active ▼]
2. ⇧⇩ Subscription 55027113 (Top Customer High Severity), using [Informational Profile ▼] Status: [Active ▼]

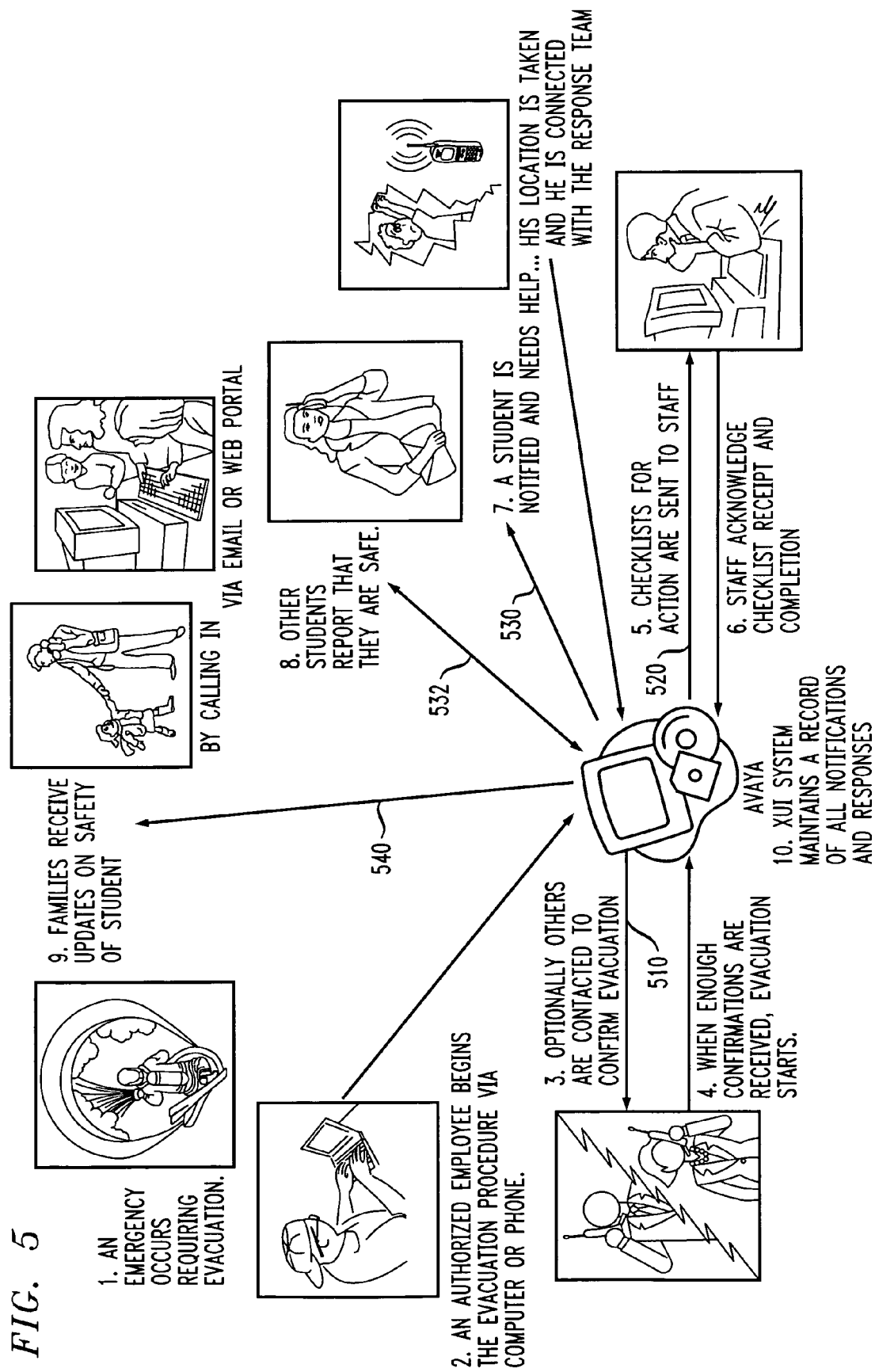

METHOD AND APPARATUS FOR AUTOMATIC NOTIFICATION AND RESPONSE BASED ON COMMUNICATION FLOW EXPRESSIONS HAVING DYNAMIC CONTEXT

CROSS REFERENCE TO RELATED APPLICATIONS

This application claims the benefit of U.S. Provisional Application No. 60/554,232, filed Mar. 18, 2004, and is related to U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," and U.S. patent application Ser. No. 11/083,068, entitled "Method and Apparatus for Dynamically Adjusting Membership of a Communication Flow Expression," U.S. patent application Ser. No. 11/083,070, entitled "Method and Apparatus for Just In Time Education," and U.S. patent application Ser. No. 11/083,069, entitled "Method and Apparatus for Subscribing to Dynamic Attributes," each filed contemporaneously herewith, and each incorporated by reference herein.

FIELD OF THE INVENTION

The present invention relates generally to communication methods and systems, and more particularly, to methods and systems that notify one or more users of information.

BACKGROUND OF THE INVENTION

Enterprise applications need to contact people and have requirements for how the contact is done and what responses, if any, are collected. For example, applications may need to contact all people who have certain interests, or a particular list of people or a single person. Applications may need to contact someone immediately in a crisis or they may want to remind someone of a task at an appropriate time. Enterprise applications also have requirements about what to do when the contact is unsuccessful, where success is something defined by the enterprise.

Recipients, on the other hand, have their own preferences about how and when they are contacted. For example, recipients may want particular people, such as a boss or family member, or people who represent particular interests, such as an executive from a Fortune 500 Company, to be given more flexibility in establishing real-time contact. In addition, recipients may routinely delay contact about known tasks, such as weekly status or expense updates, until a convenient time or place. Oftentimes, the preferences of recipients are at odds with the preferences of an enterprise or the implementation of a specific application. In those cases, recipients find creative ways to work around the application constraints, in order to satisfy their preferences, or find the enterprise's processes frustrating or even annoying.

A number of notification systems have been proposed or developed to enable applications to communicate with one or more recipients. U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, "Method and Apparatus for Automatic Notification and Response Based on Communication Flow Expressions," disclose notification and response systems. Generally, the disclosed notification and response systems (i) send requests to one or more recipients, using the medium specified by each individual recipient; (ii) collect and processes responses; and (iii) forward the responses to their final destination by means of the medium specified by the final destination.

While communication flows in such notification and response systems elicit responses from recipients and may follow different paths based on a response, they can only react to responses at the point at which they were elicited or at a subsequent point. In addition, such notification and response systems are unable to dynamically add or remove participants in a communication flow.

A need therefore exists for notification and response systems that can react dynamically to responses in a variety of locations in a communication flow, different from the location that elicited the response. A further need exists for notification and response systems that can react to changes in the data of the request. Yet another need exists for notification and response systems that understand the context of the communication flow execution and make decisions that are context dependent in the communication flow and in the rendering of information to applications.

SUMMARY OF THE INVENTION

Generally, methods and apparatus are provided for automatic notification and response based on communication flow expressions having dynamic context. A message is provided from a sender to at least one recipient in accordance with a communication flow having a plurality of potential paths. The communication flow is controlled by a communication flow expression having a dynamic context, wherein the communication flow expression contains at least one primitive keyword indicating how the message should be processed. The message is processed based on the communication flow expression.

The dynamic context of the communication flow expression may be established using one or more labels or a context function. The labels are inherited by each child node of the node to which the one or more labels are applied. The labels can optionally be used as a condition in a communication rule or tested by a conditional expression in a communication flow. The context function allows an application to set a context for the communication flow expression that is executed at the root level.

In addition, a number of primitive keywords are provided that allow a communication flow expression to react to a dynamic context. An evaluation function specifies data being watched that will trigger evaluation of a specified conditional. The evaluation function acts on changes to one or more of data and responses associated with the communication flow expression, and allows an application to dynamically add one or more nodes to the communication flow during execution of the communication flow as a result of data updates or receipt of responses.

Another primitive keyword, a watch operand, has an associated test expression that is evaluated at runtime, and the watch operand will block until the associated test expression evaluates to true, and then the watch operand will evaluate to true. The watch operand evaluates the associated test expression the first time the associated test expression is encountered and if the associated test expression is false, then the associated test expression is evaluated each time the request data is modified or a response is submitted. The watch operand can monitor a specific element in the data associated with the communication flow expression, or the responses associated with the communication flow expression and allow iterations over all values.

A pair of primitive keywords, advises or informs, cause an out-of-band communication flow expression to be evaluated outside of the scope of the main communication flow expression. A response received to the out-of-band communication flow expression is treated as a comment and does not affect the truth-value of the main communication flow expression. A consult operator evaluates all of its children and waits for one of them to result in a true or false value. For the consult operator, the result is returned as the value of the operator, but the remaining operands are placed out-of-band so that they can continue operation without affecting an outcome of the communication flow expression. A contact function allows a media contact to be defined directly in the communication flow expression.

A more complete understanding of the present invention, as well as further features and advantages of the present invention, will be obtained by reference to the following detailed description and drawings.

BRIEF DESCRIPTION OF THE DRAWINGS

FIGS. 2A through 2J, collectively, are an operator table that lists a number of exemplary communication flow operators;

FIGS. 3A through 3T illustrate the truth tables for the operators indicated in FIGS. 2A through 2J;

FIG. 4 illustrates an exemplary interface for ordering subscriptions based on labels, in accordance with the present invention;

FIG. 5 illustrates the identification of phases of a communication using labels, in accordance with the present invention;

DETAILED DESCRIPTION

Figure 1:
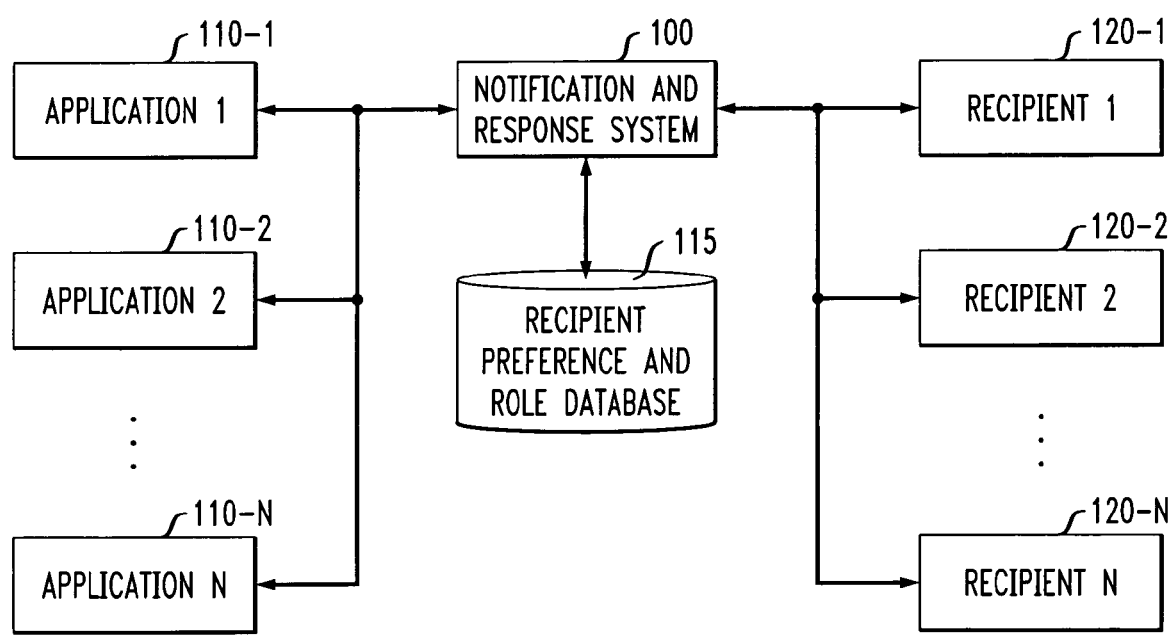
FIG. 1 illustrates an exemplary notification and response system.

FIG. 1 illustrates an exemplary notification and response system 100. The exemplary notification and response system 100 may be embodied, for example, as the Xui™ notification and response system, commercially available from Avaya, Inc. of Basking Ridge, N.J. and as described, for example, in U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

Generally, as shown in FIG. 1, the notification and response system 100 enables one or more applications 110-1 through 110-N, collectively referred to as applications 110, to communicate with one or more recipients 120-1 through 120-N, hereinafter, collectively referred to as recipients 120, by a number of different media, such as electronic mail, telephone, web page, pager or facsimile. Generally, the notification and response system 100 (i) sends requests to one or more recipients 120, using the media specified by each individual recipient 120 in accordance with the individual's preferences (and recorded for example, in a recipient preference and role database 115); (ii) collects and processes responses; and (iii) forwards the responses to their final destination by means of the medium specified by the final destination in accordance with the final destination's preferences. Roles provide a way of categorizing users and what they are allowed to do. The recipient preference and role database 115 also allows roles that are specified in a communication flow to be resolved to individual recipient names at the time the requests are transmitted.

The applications 110 create notification requests and submit them to the notification and response system 100. The notification requests must contain a communication flow to execute. Once the notification and response system 100 receives a notification request, the notification and response system 100 executes the communication flow logic to notify the recipients 120 and collect their responses.

According to one aspect of the invention, referred to herein as dynamic context adjustment, the context of a communication flow expression can be dynamically established or adjusted, using primitives, such as context and labels, discussed hereinafter, that provide dynamic context to the communication flow expression. As used herein, the "dynamic context" of a communication flow expression comprises updates that have been received to the data associated with the communication flow, responses received for the communication flow and the state of the executing communication flow. According to another aspect of the invention, referred to herein as dynamic context influence, communication flow expressions in accordance with the present invention may be processed based on their dynamic context. In one exemplary embodiment of the present invention, a number of primitives are employed that react to the dynamic context of communication flow expressions.

As discussed hereinafter, the dynamic context of a communication flow expression allows data in the request or one or more responses or labels associated with the request, to be processed and evaluated. The contextual information is available to the application for rendering its communication with the recipient. In a preferred embodiment, all data is represented in XML, and the application provides an XSLT stylesheet which the system employs for rendering. The data can trigger a particular action upon a predefined condition. The predefined condition may be, for example, data having a predefined value, the updating of the request or the receipt of a response. The triggered action may be, for example, a communication flow expression proceeding, for example, by sending one or more notifications. The present invention provides additional functionality to establish and adjust the communication flow expression, and to alter the processing of a communication flow expression based on the dynamic context.

Generally, a communication flow manager interprets the target communication flow defined in a request into a more efficient, tree structured internal representation. In addition, the communication flow manager traverses the tree representation and, in the process, expands non-terminal nodes, which represent recipients, and instantiates terminal nodes which are typically devices, but may also communicate with applications or perform internal processing. Thus, the string containing the communication flow expression is initially parsed into a parse tree, using known techniques. Generally, a parse tree is an in-memory representation of the expression composed of objects called nodes. Each node in the tree is either an operator or an operand. Operators determine a result based on their operands. Operands determine their result using logic and input from the system or a user. Operators can be operands to other operators.

After parsing, the tree is a connected set of nodes that do not have a value. In order for the tree to have a value, the tree must be evaluated. A method of the root node is invoked, and if it is an operator, the method fetches the value(s) of its operand(s) according to its functionality. If the operator completes, the value is passed back up the parse tree. Since each operand can be an operator, this evaluation will traverse down the tree until a leaf node is encountered. Each node evaluation can cause the tree to change, especially if a conditional operator is present and the condition returns a truth-value.

Communication Flow Primitives

As previously indicated, communication flow expressions specify the recipients that shall receive a request and how, when and where the recipients shall receive the request. The primitives included in a communication flow expression specify whether to contact the recipients simultaneously or sequentially, and when execution of the sub-expression should terminate by defining a logical combination of success test results. For a detailed discussion of a number of suitable communication flow primitives and their corresponding truth tables, see U.S. patent application Ser. No. 10/184,325, filed Jun. 26, 2002, entitled "Method and Apparatus for Automatic Notification and Response Based on Communication Flow Expressions," incorporated by reference herein.

FIGS. 2A through 2J, collectively, are an operator table 200 that lists a number of exemplary communication flow operators. As shown in FIGS. 2A through 2J, for each communication flow operator identified in field 210, the operator table 200 identifies the corresponding operator type in field 220, and whether or not they have a binary form or can take a list as an operand in fields 230 and 240, respectively. If an operator is related to another operator, then the related operator is also listed in field 250. Two operators are related when they have similar truth tables, but one is sequential (seq.) and the other is parallel (par.).

The truth table that corresponds to the operator is identified in field 260, and examples of the operator are provided in field 270. It is noted that not all operators have actual tables, but instead have a description of how the truth value is determined. If a table is present, then F stands for FALSE, T for TRUE, and X for MAYBE. Also, since the order of evaluation does not matter for parallel operators, the left operand is the first operand to respond and the right operand is the second to respond.

FIGS. 3A through 3T illustrate the truth tables for a number of the operators indicated in FIGS. 2A through 2J. A number of operators can be grouped into parallel/sequential pairs. Parallel and sequential primitives differ in how the operands are evaluated. A sequential operator is one that will evaluate each operand in order from left to right and will only process the next operand when a truth-value is received for the current one. A parallel operator is one that will evaluate all of its operands at once and then will wait for a truth-value to be generated on one or more of them. A time operator is one that involves scheduling a communication flow expression to be evaluated at a particular time.

Advises

ADVISES is a binary operator that causes a communication flow expression to be evaluated outside of the scope of the main expression. The truth table for the ADVISES operator is given in FIG. 3A. The value of the operator is determined by the left operand. When the left operand resolves to a truth-value, then the right operand is evaluated and is attached to the request as operating OUT-OF-BAND and any response received to that expression is treated as a comment but does not affect the truth-value of the application communication flow.

The right operand has OUT-OF-BAND attached as a label to it when advises starts its evaluation, this label can be tested inside the application to provide additional context to the recipient or to mark a response as not affecting the outcome of the request. The parallel operator related to the ADVISES operator is the INFORMS operator.

The ADVISES operator is used as follows:
cf_expression1 ADVISES cf_expression2

The left-most operand determines the truth-value of the primitive. The right-most operand is contacted after the left-most operand completes, and may respond depending on the controls of the application, for example, in an XSLT stylesheet. Responses, if received, are considered comments to the request, and are listed separately in response collations and in returned responses. Responses from the right operand do not affect the truth-value of the overall expression (or any expression containing it). The ADVISES primitive could be used to remind a recipient of commitments made in the initial response until the request completes or the commitment is satisfied.

After

AFTER is a time operator that indicates when a communication flow should begin execution. The truth table for the AFTER operator is given in FIG. 3B. When the time is reached, the AFTER operator replaces itself with its child communication flow and starts its evaluation.

The AFTER operator is used as follows:
cf_expression AFTER time_expression

If the time_expression contains a time_domain and the starting point of an increment on a time_domain is after the end of the last interval in the time_domain, then cf_expression is evaluated immediately.

And

The AND operator is a parallel operator that will evaluate all of its operands and return TRUE if and only if all of its children return TRUE. The truth table for the AND operator is given in FIG. 3C. A MAYBE value for one of its operands does not immediately complete the operator, but the operator's value can never be TRUE. A FALSE value for one of its operands will complete the operator immediately and cause it to have a value of FALSE. The sequential operator related to AND is the operator ANDTHEN.

The AND operator is used as follows:
cf_expression1 AND cf_expression2
AND {cf_expression1, cf_expression2, ... }

Andthen

The ANDTHEN operator is a sequential operator that evaluates its children starting from the left and will evaluate the next child only if the previous child evaluated to TRUE. The truth table for the ANDTHEN operator is given in FIG. 3D. The parallel operator related to ANDTHEN is the operator AND.

The ANDTHEN operator is used as follows:
cf_expression1 ANDTHEN cf_expression2
ANDTHEN {cf_expression1, cf_expression2, ... }

Broadcast

The BROADCAST operator is a parallel list operator that evaluates all of its children and waits for them to complete. The truth table for the BROADCAST operator is given in FIG. 3E. The sequential operator related to BROADCAST is the operator SURVEY.

The BROADCAST operator is used as follows:
BROADCAST {cf_expression1, cf_expression2, . . . }

The BROADCAST primitive waits until all expressions in the list have reached a final truth value (true, false, maybe). The BROADCAST primitive, however, is always true and its true value indicates that BROADCAST has completed. Sometimes a communication flow must complete contacting all members of a group irrespective of the truth-value of the responses by individuals. In this case the truth value may be used to control the communication flow of the individual exclusively. Questions in the notification might, for example, ask if the individual wishes to continue receiving reminders. An answer of no or false, might then shut off the reminders in the personal communication flow of the individual without affecting the overall communication to the group.

Consult

The CONSULT operator is a parallel list operator that evaluates all of its children and waits for one of them to result in a TRUE or FALSE. This result is returned as the value of the operator, but the remaining operands are placed OUT-OF-BAND so that they can continue operation but have no affect on the outcome of the overall expression. They are additionally tagged with the OUT-OF-BAND label. The truth table for the CONSULT operator is given in FIG. 3F.

The CONSULT operator is used as follows:
CONSULT {cf_expression1, cf_expression2, . . . }

Delegates

The DELEGATES operator is a sequential operator that evaluates each operand starting with the left most, and then evaluates each subsequent one if and only if the previous operand evaluated to MAYBE. The truth table for the DELEGATES operator is given in FIG. 3G. The parallel operator related to DELEGATES is the operator RACES.

The DELEGATES operator is used as follows:
cf_expression1 DELEGATES cf_expression2
DELEGATES {cf_expression1, cf_expression2, . . . }

During

The DURING time operator causes its child cf_expression to be executed during the given time_domain. If the current time is within the specified time domain, then the expression evaluates immediately, otherwise it sets a timer to begin processing of the expression when the current time is within the time domain. The truth table for the DURING operator is given in FIG. 3H.

The DURING operator is used as follows:
cf_expression DURING time_domain

From-To

The FROM-TO time operator indicates a start and end time for the evaluation of a communication flow. This is a convenience operator to make an expression more legible than it would be if AFTER and UNTIL were used. In fact, the exemplary notification and response system 100 converts a FROM-TO expression into an expression using AFTER and UNTIL. The truth table for the FROM-TO operator is given in FIG. 3I.

The FROM-TO operator is used as follows:
cf_expression FROM time_expression1 TO time_expression2
and is equivalent to:
(cf_expression UNTIL time_expression2) AFTER time_expression1

If the starting point of an increment on a time_domain in time_expression1 does not exist within the time_domain, then cf_expression is evaluated immediately. If time_expression2 contains a time_domain that is empty or an error occurs when time_expression2 is evaluated, then cf_expression will not timeout.

If-Then-Else

The IF-THEN-ELSE operator provides a mechanism for conditional (cond.) branching within communication flows. If the IF expression evaluates to TRUE, then theN expression replaces the operator and will determine the truth value of the operator. If the IF expression evaluates to FALSE or MAYBE, then the ELSE expression replaces the operator and will determine the truth value of the operator. The truth table for the IF-THEN-ELSE operator is given in FIG. 3J.

The IF-THEN-ELSE operator is used as follows:
IF cf_expression1 THEN cf_expression2 ELSE cf_expression3

Informs

The INFORMS operator is a binary operator that causes a communication flow expression to be evaluated outside of the scope of the main expression. The value of the INFORMS operator is determined by the left operand. When the operator is first evaluated, both operands are evaluated, but the right operand is attached to the request as operating OUT-OF-BAND and any response received to that expression is treated as a comment and does not affect the truth-value of the main communication flow. The truth table for the INFORMS operator is given in FIG. 3K.

The right operand has OUT-OF-BAND attached as a label to it when INFORMS starts its evaluation, this label can be tested inside the application to provide additional context to the recipient or to mark a response as not affecting the outcome of the request.

The sequential operator related to INFORMS is the operator ADVISES. The INFORMS operator is used as follows:
cf_expression1 INFORMS cf_expression2

The left-most operand determines the truth-value of the primitive. The right-most operand is contacted in parallel, and may respond depending on the controls of the application, for example, in an XSLT stylesheet. Responses, if received, are considered comments to the request, and are listed separately in response collations and in returned responses. Responses from the right operand do not affect the truth-value of the overall expression (or any expression containing it). This INFORMS primitive could be used, for example, to keep colleagues, friends and family informed of notifications one receives.

Not

The NOT operator performs a logical negation on its operand. The truth table for the NOT operator is given in FIG. 3L. The NOT operator is used as follows:
NOT cf_expression Or The OR operator is a parallel operator that evaluates all of its operands initially. The OR operator will complete as soon as one of its operands results in a truth-value of TRUE. The truth table for the OR operator is given in FIG. 3M. The sequential operator related to OR is the operator ORELSE. The OR operator is used as follows:
cf_expression1 OR cf_expression2
OR {cf_expression1, cf_expression2, . . . }

Orelse

The ORELSE operator is a sequential operator that evaluates its children starting from the left and will evaluate the next child only if the previous child evaluated to FALSE. The truth table for the ORELSE operator is given in FIG. 3N. The parallel operator related to ORELSE is the operator OR. The ORELSE operator is used as follows:

cf_expression1 ORELSE cf_expression2
ORELSE {cf_expression1, cf_expression2, ... }
Polls The POLLS operator is a sequential list operator that evaluates each of its children in order, its value is determined by the number (or percentage) of TRUE values required. Due to the preemptive evaluation of this operator, it is possible that all operands will not be evaluated. The POLLS operator is the only sequential operator that resolves all of its operands before evaluating the first operand. This allows the POLLS operator to determine an early termination point. The truth table for the POLLS operator is given in FIG. 3O. The parallel operator related to POLLS is the operator VOTES. The POLLS operator is used as follows:

{cf_expression1, cf_expression2, cf_expression3, ... }
   POLLS n
{cf_expression1, cf_expression2, cf_expression3, ... }
   POLLS p% where n is the number of TRUE responses required by POLLS to return TRUE, and p% is the percentage of TRUE responses required by POLLS to return TRUE.

Races

The RACES operator is a parallel operator that evaluates all of its children and completes as soon as any operand results in a truth-value of TRUE or FALSE. The truth table for the RACES operator is given in FIG. 3P. The sequential operator related to RACES is the operator DELEGATES. The RACES operator is used as follows:

cf_expression1 RACES cf_expression2
RACES {cf_expression1, cf_expression2, ... }
Survey The SURVEY operator is a sequential list operator that evaluates each of its children in order from left to right regardless of the value of the preceding operand. All operands will eventually be evaluated until SURVEY completes, or is canceled. The truth table for the SURVEY operator is given in FIG. 3Q. The parallel operator related to SURVEY is the operator BROADCAST. The SURVEY operator is used as follows:

SURVEY {cf_expression1, cf_expression2, ... }

The SURVEY primitive contacts each expression in the list when the previous expression has reached a final truth value (true, false, maybe). The SURVEY primitive completes after the last expression completes. The SURVEY primitive, however, is always true and its true value indicates that SURVEY has completed.

Until

The UNTIL operator is the time operator that indicates when a communication flow should stop executing. The truth table for the UNTIL operator is given in FIG. 3R. The UNTIL operator is used as follows:

cf_expression UNTIL time_expression

If time_expression contains a time_domain that is empty, or an error is generated while evaluating the time_expression, then cf_expression will not timeout.

Votes

The VOTES operator is a parallel list operator that evaluates all of its children, its value is determined by the number (or percentage) of TRUE values required. The truth table for the VOTES operator is given in FIG. 3S. The sequential operator related to VOTES is the operator POLLS. The VOTES operator is used as follows:

{cf_expression1, cf_expression2, cf_expression3, ... }
   VOTES n
{cf_expression1, cf_expression2, cf_expression3, ... }
   VOTES p% where n is the number of TRUE responses required by VOTES to return TRUE, and p% is the percentage of TRUE responses required by VOTES to return TRUE.

When-IsTrue-IsFalse-IsMaybe

The WHEN-ISTRUE-ISFALSE-ISMAYBE operator allows conditional branching within an expression by allowing the user to specify what is to happen for each possible truth-value of the conditional. The truth table for the WHEN-ISTRUE-ISFALSE-ISMAYBE operator is given in FIG. 3T. The operand of the operator specified for the value of the conditional replaces the operator and evaluation continues with that operand. If an operand is not specified for a particular value, then the operator results in that value. The order in which the value-operand pairs are given does not matter. The WHEN-ISTRUE-ISFALSE-ISMAYBE operator is used as follows:

WHEN cf_expression1
[ISTRUE cf_expression2]
[ISFALSE cf_expression3]
[ISMAYBE cf_expression4]

Primitives that Provide Dynamic Context

As previously indicated, communication flow expressions in accordance with the present invention may be processed based on dynamic context. In one exemplary embodiment of the present invention, two language constructs, context and labels, discussed hereinafter, are employed to provide dynamic context to the communication flow expression.

Context Primitive: Setting Context for an Expression in the Root Flow

Some communication flow operands and test expression functions require a context in order to properly evaluate. The context is typically set when a user's name is resolved to a communication flow expression and it is the user. Therefore, application expressions have no context and any direct children that are not people, also have no context. This can be a problem for the EVAL function and the WATCH operand, each discussed below. Since the EVAL function and the WATCH operand (when it is interested in a specific data element) keep track of the last element viewed and this count is stored in a map keyed by the element name and the context, there could be collisions between the EVAL function and any other WATCH operands if they are all viewing the same data element. For example, the following application communication flow expression would have indeterminate results since there are two watch operands counting responses:

```
BROADCAST {
    ham, joann,
    WATCH "xui:response" ?
    data("xui:response[%%INDEX%%]/@uid") = "joann" ?
       ANDTHEN ham,
    WATCH "xui:response" ?
    data("xui:response[%%INDEX%%]/@uid" = "ham" ?
       ANDTHEN joann
}
```

If the application was trying to notify "ham" and "joann" and then send a notification when the other responded, this would not work. One of the watch operands would consume all of the responses not letting the other see them because they share the same context. In order to resolve this problem, a context function allows the application to set the context for a communication flow expression that is executed at the root level:

CONTEXT(string userContext, cfexpression expr)

When the expression parser encounters a context function in its grammar, it calls a method on the root of the subtree created by parsing the second argument of the context function, in order to set the context. This method call causes the context to propagate down the subtree, setting the context on all nodes that do not currently have a context defined. If the "userContext" argument is NULL, then the context is unset for the entire subtree, allowing subsequent context functions to set the context on the entire subtree.

The above expression can now be rewritten as:

```
BROADCAST {
  ham, joann,
  CONTEXT("uid=ham,ou=Research,o=Avaya",
    WATCH "xui:response"
      ? data("xui:response[%%INDEX%%]/@uid") = "joann" ?
    ANDTHEN ham),
  CONTEXT("uid=joann,ou=Research,o=Avaya",
    WATCH "xui:response"
      ? data("xui:response[%%INDEX%%]/@uid = "ham" ?
    ANDTHEN joann)
}
```

With the context set appropriately to the context of the appropriate user, there is now no longer any concern for a collision.

However, since the keys for the indices in the map are global to the active communication flow, if either "ham" or "joann" are watching responses in a personal communication flow expression, it is possible to still have a collision because the context would be the same as the one set in the application communication flow expression. In specifying the first WATCH parameter, applications and users can mitigate this effect by selecting a specific data element in the response to watch thereby reducing the probably of collisions.

There are security implications for setting the context. If there is no context, then it is assumed to be the application communication flow expression, and therefore all of the responses received are available to the WATCH operand and any data( ) function in the test expression. Setting a context can limit the set of responses if a system privacy flag is set on any of them and the user represented by the context is not authorized to view them. Since the setting of the privacy flag is application controlled, it is assumed that it would not be used when an application is using an expression similar to the given example.

Labels

As discussed hereinafter, a label provides a mechanism for an application to provide context through labels when a communication flow is generated. Labels are inherited by all of the child nodes of the node to which they are applied. When dynamic delegation occurs, i.e. a user replaces his/her personal communication flow with an alternate communication flow, the new communication flow for the user inherits the labels of its parent, but not any labels from the previous and now replaced user communication flow. Labels are also unique; if a label is applied more than once the duplicate is thrown away. This is important with regards to recursion and loop detection (as discussed herein).

U.S. patent application Ser. No. 10/999,890, filed Nov. 30, 2004, entitled "Method and Apparatus for a Publish-Subscribe System with Access Controls," and incorporated by reference herein, discloses a subscription server that notifies users of information based on subscriptions that have been entered by the user. The subscription server provides a list of one or more subscribable objects to the users; and the users provide a subscription request based on at least one of the subscribable objects.

Generally, the subscription server matches data of events against subscriptions to get a list of recipients for each event. The list of recipients includes subscribers who subscribe to the event themselves and delegates who receive the delegation of the event from someone else. If the recipient list is not empty, a request will be sent out with a communication flow containing those recipients as its target. When the subscription server composes the communication flow, the subscription server includes the subscription ID, and/or delegation information in labels for each recipient in the list. For example:

```
( BROADCAST { NORESULT, [SubscriptionID: 26600092]
  <uid=user1,ou=people,o=avaya.com>, [SubscriptionID: 49686824]
  <uid=user2,ou=people,o=avaya.com> } ) ? response('submit') =
  'Yes' || response('submit') = 'Watch' ?
```

In another example:

```
( BROADCAST { NORESULT, [Delegationtype: SHARED]
  [SubscriptionID: 26601102] (
  [Delegatedby: UserA] <uid=UserB,ou=people,o=avaya.com>
  RACES [Delegatedto: UserB]
  <uid=UserA,ou=people,o=avaya.com> ) } ) ? response('submit') =
  'Yes' || response('submit') = 'Watch' ?
```

Labels are the fragments enclosed in a pair of square brackets. They provide a context for the expression that follows. When the notifications for these subscriptions are delivered, the application or the system can use the context to tell the recipient the subscription that generated the message, and, if a delegation, information about the delegation.

The exemplary notification and response system 100 is a rule-based notification system. For a more detailed discussion of communication rules, see, U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein. For example, recipients can specify rules for refining communication flow expressions with details of how, i.e., which devices to use, and when to contact them.

Generally, communication rules are used to describe the condition under which one notification profile will be used. Labels provide the context, so they are good candidates to be used in the communication rule as a condition. When users create subscriptions using the subscription portal, a web-based user interface, they also create communication rules, which associate notification profiles with certain subscriptions. Each communication rule is assigned a number. A communication flow engine evaluates each user's communication rules in numeric order and applies the first one that matches. Thus, labels simplify ordering of subscriptions to determine which preferences to use when multiple subscriptions match.

FIG. 4 illustrates an exemplary interface 400 for ordering subscriptions based on labels. As shown in FIG. 4, an exemplary user (userA) has subscription 55027102 (102) and subscription 55027113 (113). The user subscribes to Company One's high severity cases in subscription 102. Because Company One is his customer, he uses a more urgent profile "7×24 Profile" for this subscription. The user also subscribes to all top customers' high severity cases in subscription 113 using a less proactive profile called "Informational Profile."

Because Company One is one of the top customers, both subscriptions will match Company One's high severity cases. The communication flow of the request of such a case includes the user, userA, as one of its recipients with two labels.

```
( BROADCAST { NORESULT, [SubscriptionID: 55027102]
  [SubscriptionID: 55027113]
  <uid=userA,ou=people,o=avaya.com> } ) ? response('submit') =
  'Yes' || response('submit') = 'Watch' ?
```

The ordering of the rules will eventually decide which rule to pick. UserA can use arrows, as shown in FIG. 4, to order those communication rules. This simplifies the ordering of subscriptions and the rule matching process.

First, the labels provide one characteristic of the incoming message to match. In the absence of a facility for matching incoming messages against the subscription ID (i.e. labels), the rule processing software would need to match a more complex relational expression on the content of the message to see if it matched a given subscription. It has additional disadvantages besides complexity. The subscription server already matches the complex logical expression as part of determining that the subscription matches the incoming request. Having the communication flow rules also do this matching is redundant. Another disadvantage is that both the subscription server and the communication flow engine must have the text of the full logical expression, and they use different data stores. This can cause skew between the data stores.

Second, the labels for subscription IDs provide a set of disjoint rule conditions for evaluating which rule matches. Either the subscription for the rule generated the notification or not. Without the labels, users or the interface software would need to order a user's subscriptions based on the relational expressions satisfied by the subscription. They would need to order the overlapping subscriptions from the most specific to the least specific relational expression. This is the way that the subscriptions in FIG. 4 are ordered. Moreover, some subscriptions will partially overlap and further confuse the issue. For example, if the first subscription in FIG. 4 was changed to subscribe to high severity cases for Company One or Company Two, and only Company One was a Top Customer, the resulting two subscriptions would not completely overlap. Now, add a subscription to all cases for Company Two. There are no complete orderings from specific to general of the three subscriptions, and this is likely to confuse the user further. It is also likely to be difficult to manage if an attempt is made to aid the user. With labels, understanding how to order subscriptions from specific to general is not necessary. The intention of the user is clear, because the user is ordering unique subscription IDs where only one will apply in each test.

FIG. 5 illustrates the identification of phases of a communication using labels, in accordance with the present invention. Labels can also be used to provide context when applications generate a communication flow. For example, as shown in FIG. 5, assume an application has four different types of interactions that are planned with recipients depending on the phase of the communication or other criteria. In FIG. 5, a first group is contacted during step 510 and asked to confirm evacuation, a second group is sent checklists of actions to follow during step 520, a third group is asked for their location, condition and whether they need assistance during steps 530 and 532, and a fourth group receives reports on the condition of the third group during step 540. The communication flow subexpression for contacting each group can be preceded by a label identifying their role in the communication. The application can then use the label to determine which interaction to have with the recipient.

Labels also provide a tracking mechanism that helps to associate the result (this person is included in the communication flow) with the reason (he/she subscribed or is delegated to this event). This information is useful for users to maintain their profiles and subscriptions and for system administrators to monitor the system. It can be used for reporting and database analysis. Labels can also be tested in a conditional expression of a communication flow, for example, to trigger an action.

Primitives that React to Dynamic Context

As previously indicated, communication flow expressions in accordance with the present invention may be processed based on dynamic context. In one exemplary embodiment of the present invention, a number of primitives, discussed hereinafter, are employed that react to the dynamic context of communication flow expressions.

Eval Primitive

An EVAL function allows an application to extend the root communication flow using expressions added to the data or located in user responses. The function has the following form:

EVAL(string watchString, test expression conditional, string evalString)

where "watchString" is an XPath expression that indicates the data being watched that will trigger evaluation of the conditional. If the conditional is true, then the "evalString" (also a XPath expression) is evaluated to fetch the expression from the data. Using known techniques, discussed briefly above, this expression is parsed into a subtree that is added as a child of the eval function's parent node. It is noted that "evalString" is optional, if it is not specified, it is assumed to be "(watchString)[%%INDEX%%]". When EVAL begins execution, it iterates over all values of the watched expression. This may cause it to trigger several times for values that already exist, and then to trigger for new values as they arrive.

The EVAL function may only be used in the application root communication flow expression and then only as the child of a parallel list operator such as BROADCAST or RACES. If the EVAL function is used in the expression of a user, or its parent is not a parallel list operator, the EVAL function will replace itself in the parse tree with a MAYBE value.

Consider the following example:

```
BROADCAST { EVAL('commflow', ? true ?,
  'commflow[%%INDEX%%]'),
  <ham>, <joann> }
```

Figure 6:
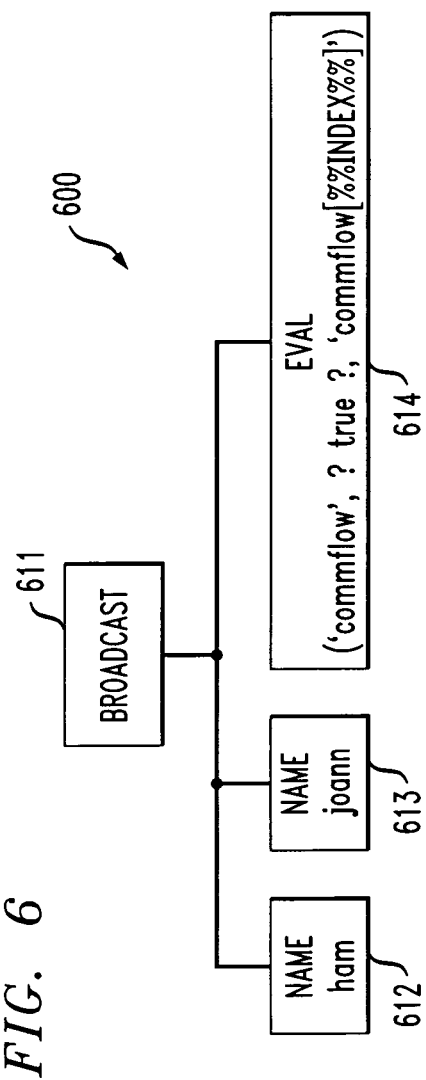
FIGS. 6 and 7 illustrate an exemplary parse tree and a corresponding modified parse tree for a communication flow expression that contains an eval function.

This example says to contact the users "ham" and "joann" and every time a new "commflow" element is added to the data, take its value, parse it and add the new subtree as a child of BROADCAST (the parent node of the EVAL). In the example, the %%INDEX%% string is replaced with the index number of the element in the data that should be accessed. FIG. 6 illustrates a parse tree 600 built from this expression, it contains four nodes 611-614 with the root 611 of the tree 600 being the BROADCAST operator (for clarity, the names have not been further resolved in the example.)

Figure 7:
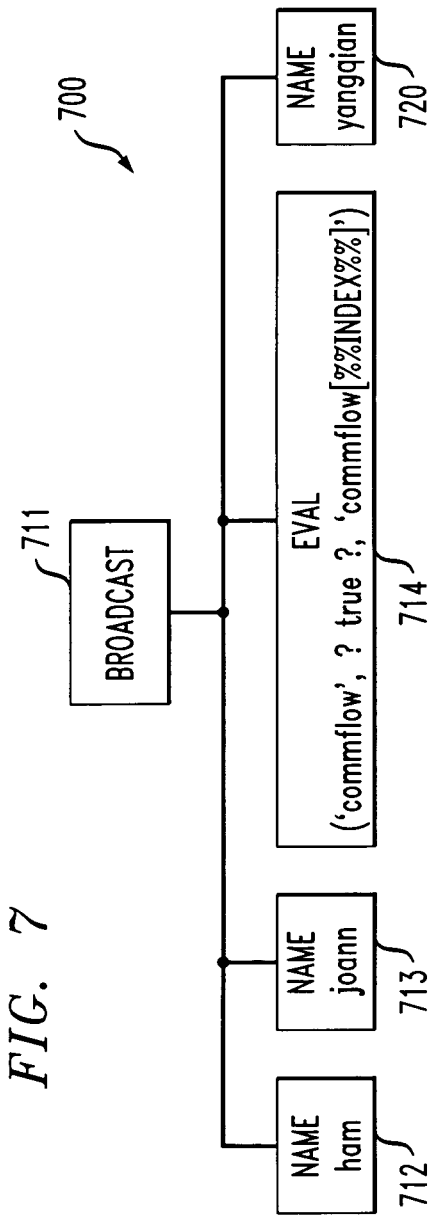

FIG. 7 shows the modified parse tree 700 after a "commflow" element with a value of 'yangqian' was added to the data—a new name node 720 has been added to the tree 700.

Watch Primitive

The WATCH operand is always associated with a test_expression and it is evaluated at runtime. However, watch will block until its test_expression evaluates to true, and then it will evaluate to TRUE. There are two forms of WATCH.

The first form of the WATCH primitive is the simplest, it evaluates its test_expression the first time it is encountered and if test_expression is false, then it is evaluated each time the request data is modified or a response is submitted.

The second form of the WATCH primitive is monitoring a specific element in the data, or the responses and allows iteration over all values. It will evaluate its test_expression when a new value is added for the element being watched, or a new response is submitted. In addition to changes seen after watch has started, it will also iterate through all values for the watched element (or responses) that were posted before the watch was initially evaluated and evaluate the test_expression on each value. If %%INDEX%% is used in the test_expression, WATCH will replace it with the index of the value to test. If this form is not used in a recursive expression, then its behavior is the same as the first form.

The WATCH primitive is used as follows:
WATCH test_expression
WATCH string test_expression In the second form of the WATCH operand, the string before the test_expression contains the name of the data element being watched. For example, the following expression:
WATCH ? boolean(xui:response[xui:responder/@uid='John'])?
evaluates to true if the user John has submitted a response, if John has not submitted a response, then this will block until he does.

In a further example, the following expression:
WATCH 'status'? data('status[%%INDEX%%]')=='field'?
evaluates to true when the status element in the data contains a value of 'field'.

Further Communication Flow Issues

Communication Flow Language Extensions

An EXTENSION( ) function provides a mechanism for a developer to add new communication flow constructs to the language without modifying the grammar of the language itself. It has the following form:
EXTENSION(string extensionName, arg1, arg2, arg3, . . . )

The "extensionName" is the name of the implementation of the extension; this might be a shared object or dynamically loaded library, or a Java class. Each subsequent argument is either a string or a communication flow expression that the extension will operate upon. For example, if a user wanted to recreate the NOT operator, an implementation in Java might look like this in an expression:
EXTENSION('com.bar.foo.Not', ham RACES joann)
this would be equivalent to NOT (ham RACES joann)
if the appropriate logic was defined in the Java class "com.bar.foo.Not" to implement the NOT truth table.

Figure 8:
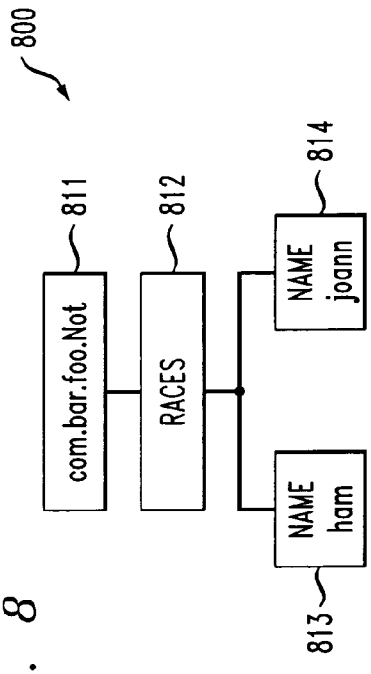
FIG. 8 illustrates a parse tree for a communication flow expression that contains an extension of the communication flow language.

FIG. 8 shows the parse tree 800 created by parsing the above extension example. This parse tree 800 is made up of four nodes 811-814 with the 'com.bar.foo.Not' node 811 as the root.

This Operand: Recursion and Loop Detection

A THIS operand allows the communication flow expression writer to use recursion without the need to know the name of the expression. The THIS operand can be either constant or dynamic depending on where it is used. If the THIS operand is used in an application communication flow expression, then it refers to the actual expression being processed (i.e., the text of the expression) and therefore is constant. Otherwise, if used in a user's communication flow expression, the THIS operand represents the name of the currently executing communication flow expression and allows the flow writer to change the expression of the flow while the communication flow is active and alter its behavior.

In order to prevent excessive consumption of resources, a loop detection scheme can be implemented. This algorithm allows only one occurrence of a particular name, SEARCH( ) function or THIS in the evaluation path of the parse tree. The evaluation path is the path taken through the tree from the root to a leaf node. Therefore, a name maybe used elsewhere in the tree, and may even be a sibling of itself, but it may not be a child of itself unless evaluation is halted by a time (see example below) or sequential operator. To determine if two nodes are equal, the name, SEARCH parameters or THIS, the context of the node, and the number of labels are compared. If they are equivalent, then a loop is considered to exist and the bad node is replaced by a MAYBE. Only the number of labels needs to be compared since each child node inherits the labels of its parent and they are unique, so there is no need to compare their actual values. Each time a name, SEARCH, or THIS node is encountered during evaluation, the node is pushed onto a stack. When a new name, SEARCH or THIS is encountered, the stack is checked to see if an equivalent node is in it. If there is an equivalent node, then the node being evaluated is replaced by a MAYBE and evaluation returns to the parent to continue with any other children. When a name, SEARCH or THIS node is finished being evaluated, it is popped off of the stack so that it can be used elsewhere in the parse tree. To catch a loop in the application communication flow expression, when the first expression is evaluated, it is pushed onto the stack.

A typical use of recursion with labels is to have a contact repeatedly "fire" at regular intervals:

---

IF TEST ? label('PageMe') ?
   THEN ( <PagerContact> RACES ( THIS AFTER + 00:10 ) )
   ELSE ( <WebContact> RACES <MailContact> RACES [PageMe] THIS )

---

This expression says to contact the user via the web and electronic mail and to page him every 10 minutes.

Figure 9:
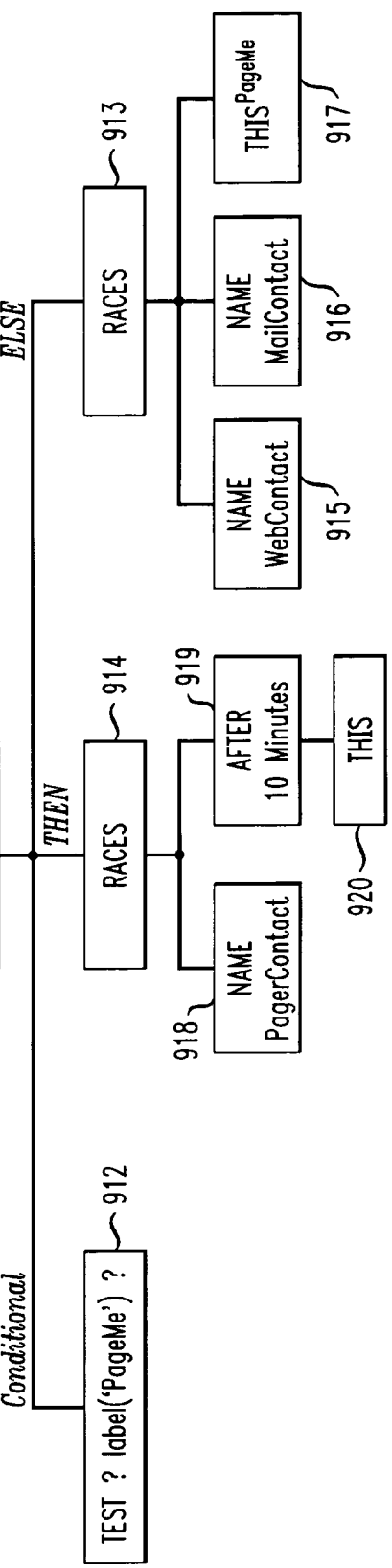
FIGS. 9 through 17 illustrate a number of variations of a parse tree to illustrate recursion in accordance with the present invention.

FIG. 9 shows the initial parse tree 900 for this expression. The edges representing the links to the children of the IF operator are labeled with their functionality. The "PageMe" label is represented in superscript after the node name of the node(s) 917 to which it is attached. After parsing the expression into the tree 900, the expression is evaluated to determine a truth-value. This evaluation causes the conditional to be evaluated, which generates a FALSE since the "PageMe"

label is not attached to the test node 912. The else clause then replaces the IF as the root of the expression and it is then evaluated. Evaluation of the name nodes 915, 916 results in a media contact node replacing the corresponding name node in the tree 900.

Figure 10:
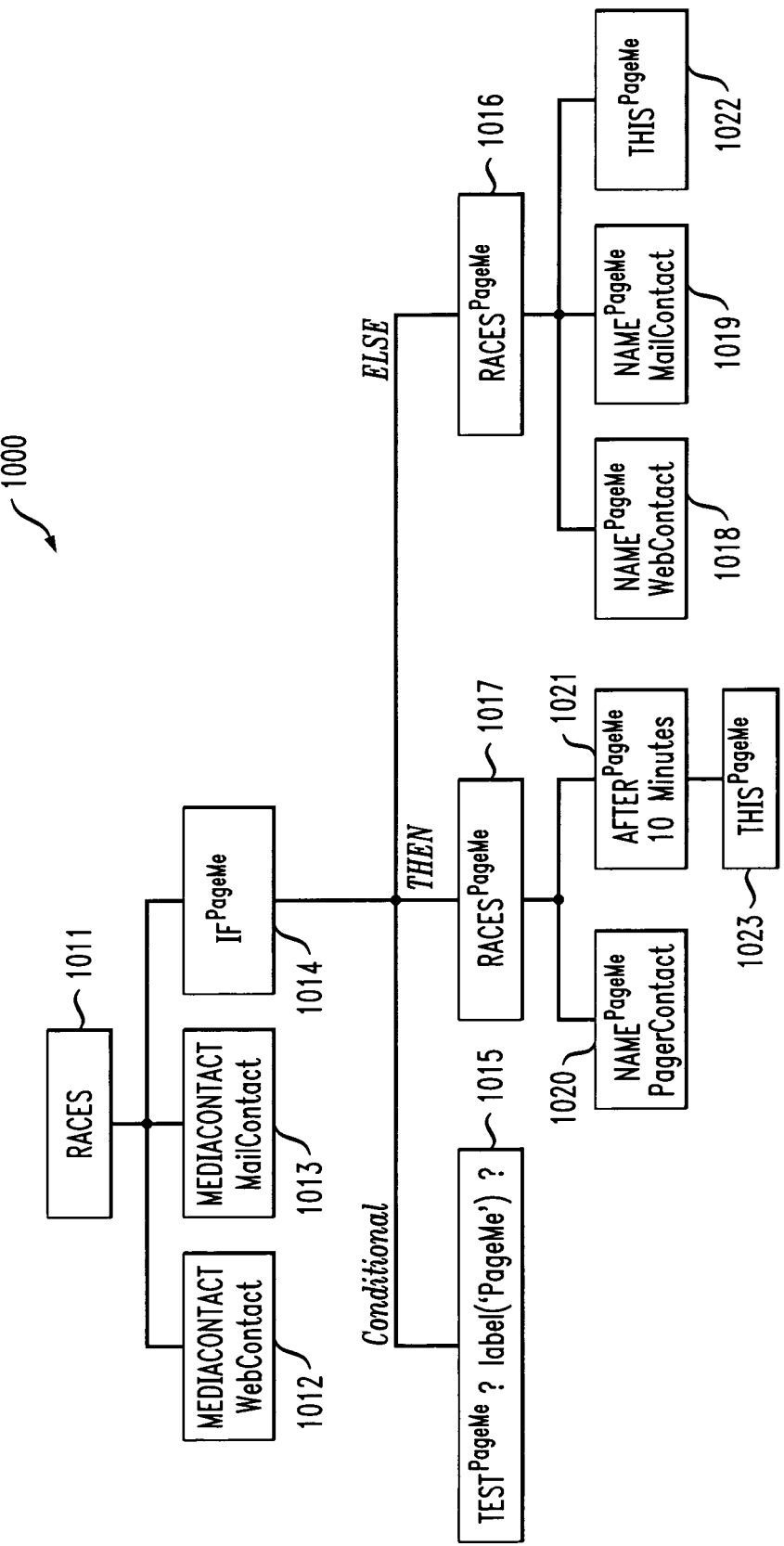

During evaluation, a new parse tree of the original expression replaces the THIS node, with one difference, the "PageMe" label is now applied to the tree and is attached to all leaf nodes—this label is what prevents the loop detection algorithm from halting evaluation. The new parse tree 1000 is shown in FIG. 10. Evaluation continues with the evaluation of the new test node 1015. This node 1015 now results in TRUE since the "PageMe" label is attached to it, therefore theN clause replaces the IF in the parse tree 1000. Evaluation continues with the "PagerContact" name 1020 resolving to a media contact node. Evaluation stops at the AFTER node 1021 since that indicates a time delay.

Figure 11:
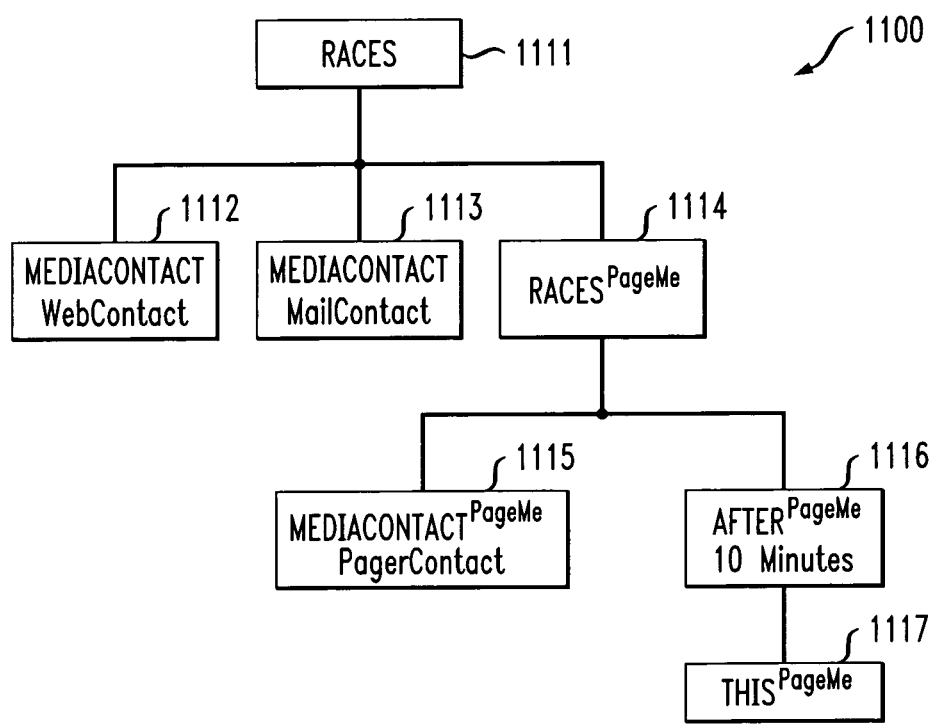
Figure 12:
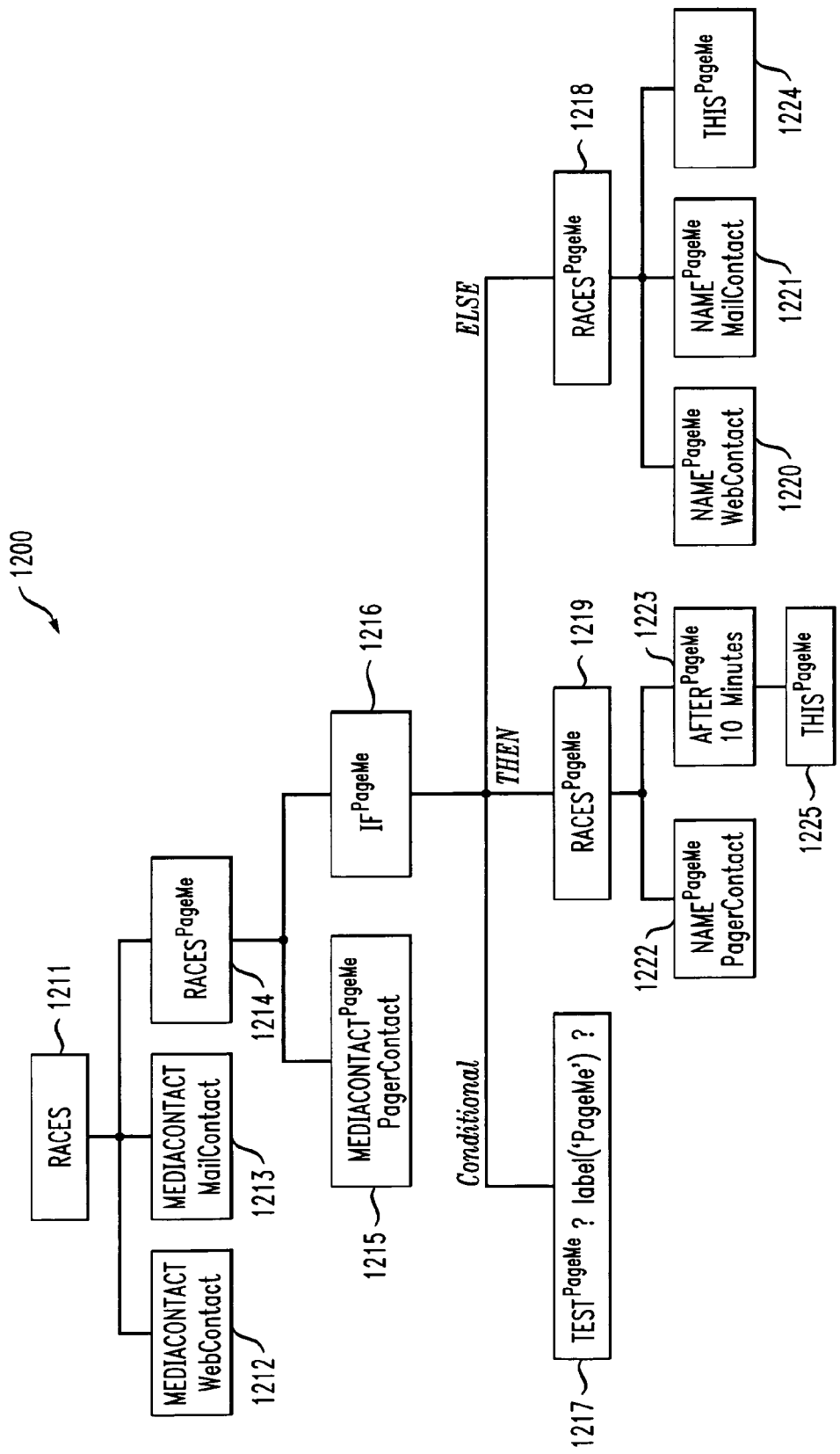
Figure 13:
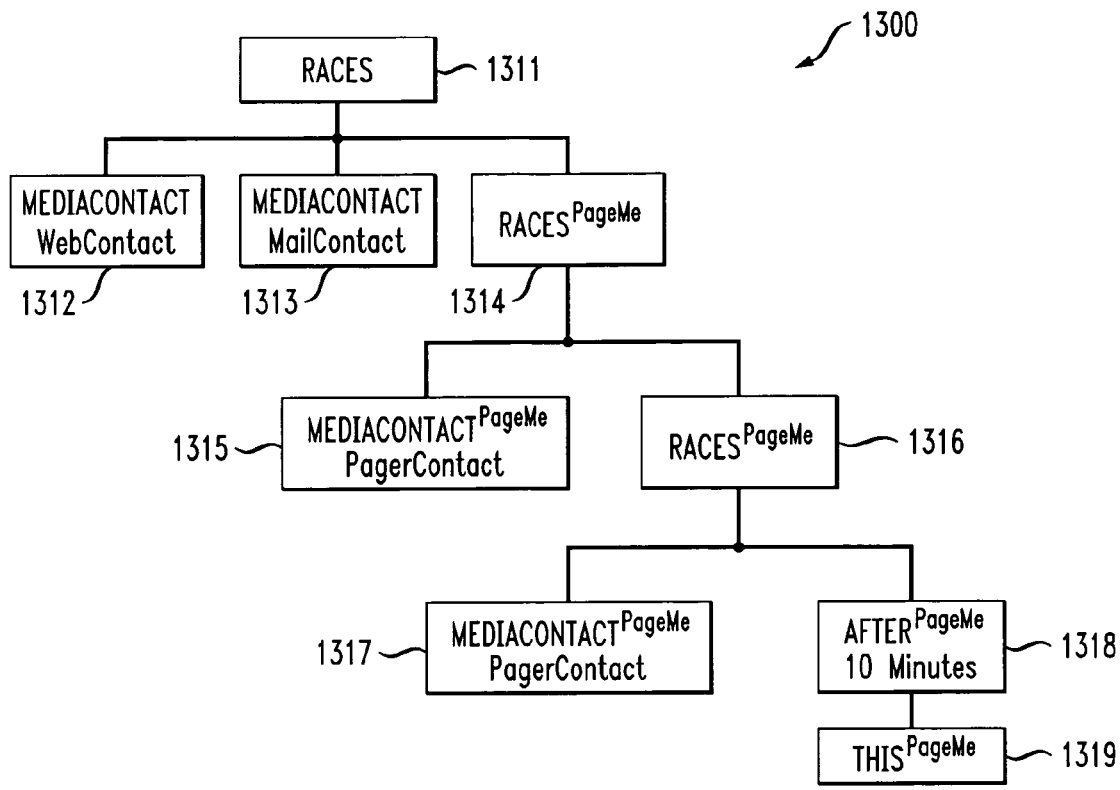

FIG. 11 displays the new parse tree 1100 after the AFTER node 1116 halted evaluation. Since evaluation was halted, the THIS node 1117 was not evaluated and no loop was detected. If the owner of this communication flow has not posted a response before 10 minutes have elapsed, then the after node 1116 replaces itself in the tree with its child and triggers evaluation of the THIS node 1117 resulting in the original parse tree 900 being added to the current parse tree 1100, as shown in FIG. 12. After evaluating the conditional you then have the parse tree 1300 depicted in FIG. 13. This growing of the parse tree will continue every 10 minutes until the user responds or the overall communication flow completes.

Figure 14:
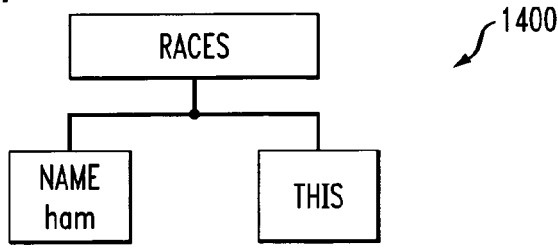
Figure 15:
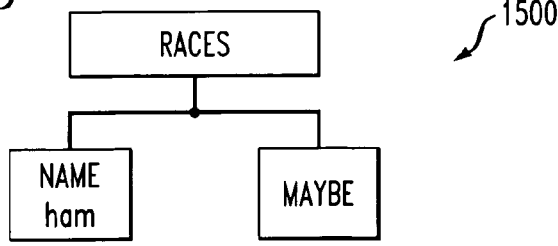

The following expression is an example of an application communication flow expression that contains an infinite loop, and the cycle detection algorithm stated above would prevent it from consuming resources (FIG. 14 shows the parse tree for this expression, and FIG. 15 shows the parse tree after the initial evaluation):

ham RACES THIS

Figure 16:
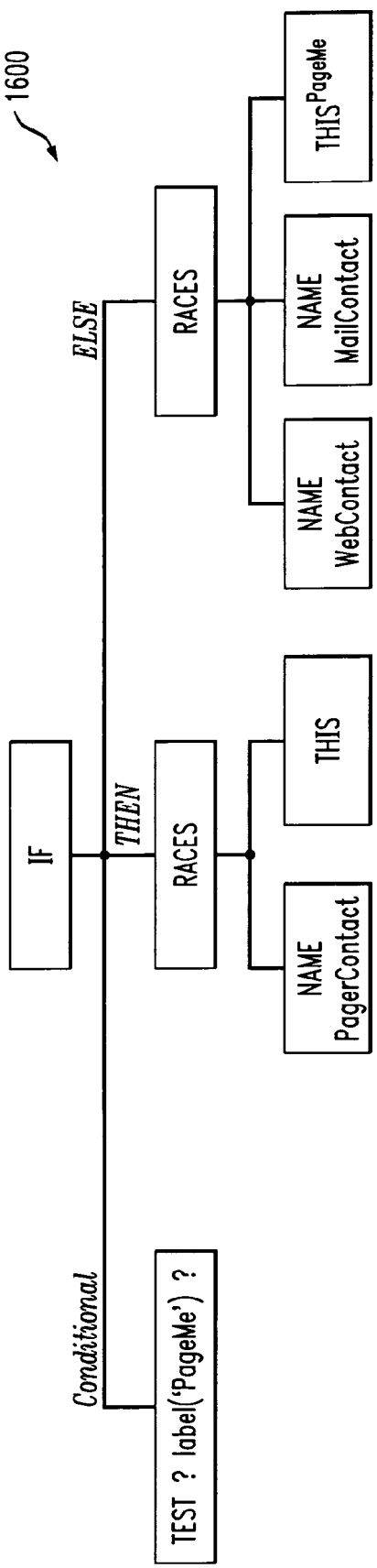
Figure 17:
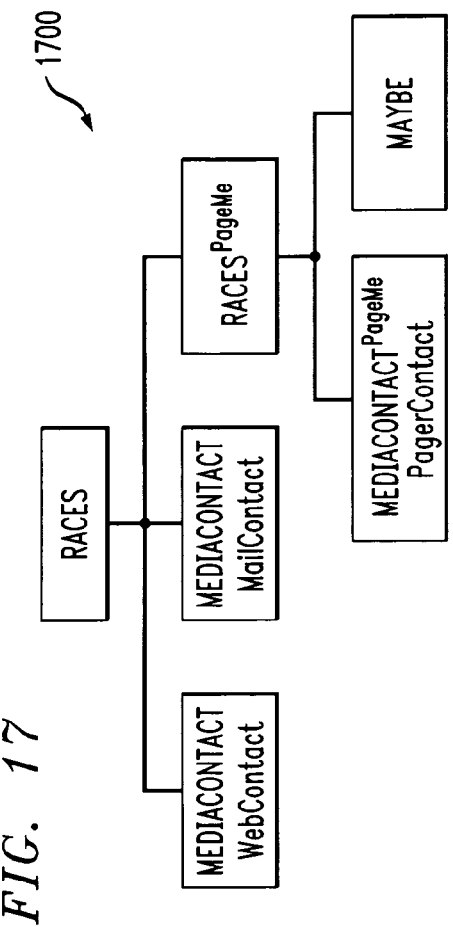

The pager example can be used to demonstrate a user communication flow with an infinite loop. If you remove the AFTER operator, you get the following expression (FIG. 16 shows the initial parse tree 1600, and FIG. 17 shows the parse tree 1700 after evaluation—skipping the step similar to that shown in FIG. 10):

```
IF TEST ? label('PageMe') ?
  THEN ( <PagerContact> RACES THIS AFTER + 00:10 )
  ELSE ( <WebContact> RACES <MailContact> RACES [PageMe]
    THIS )
```

Memory Management

In order to improve memory management, several techniques are used. First, when a subtree of the communication flow parse tree evaluates to a truth-value, it is replaced by a node that represents that truth-value, allowing the memory consumed by the subtree to be released to the system. Additionally, there is only one allocated copy of each truth-value in the system and they are shared by all active communication flows.

Figure 18:
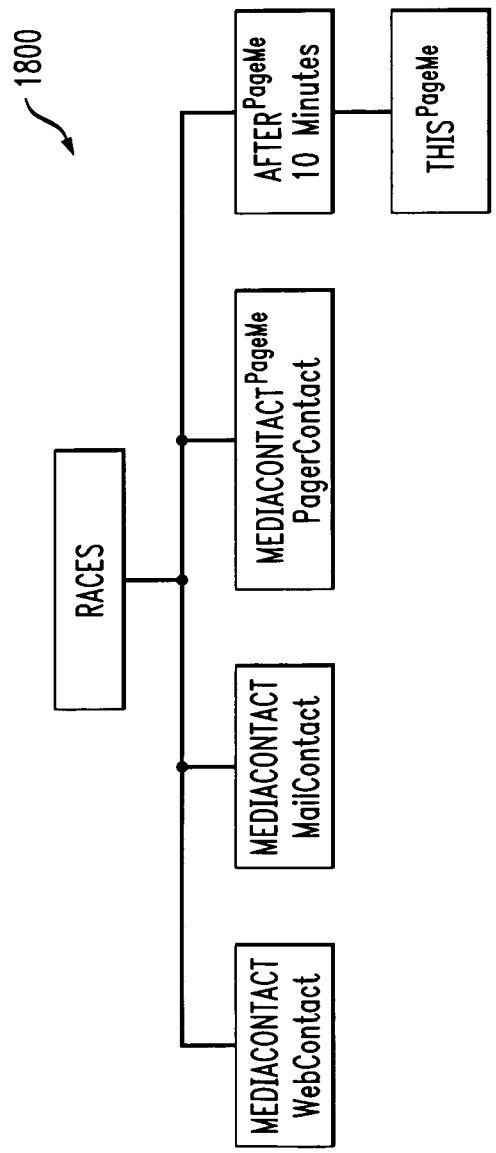
FIGS. 18 through 20 illustrate a memory management optimization for the pager example illustrated in FIGS. 11 through 13.
Figure 19:
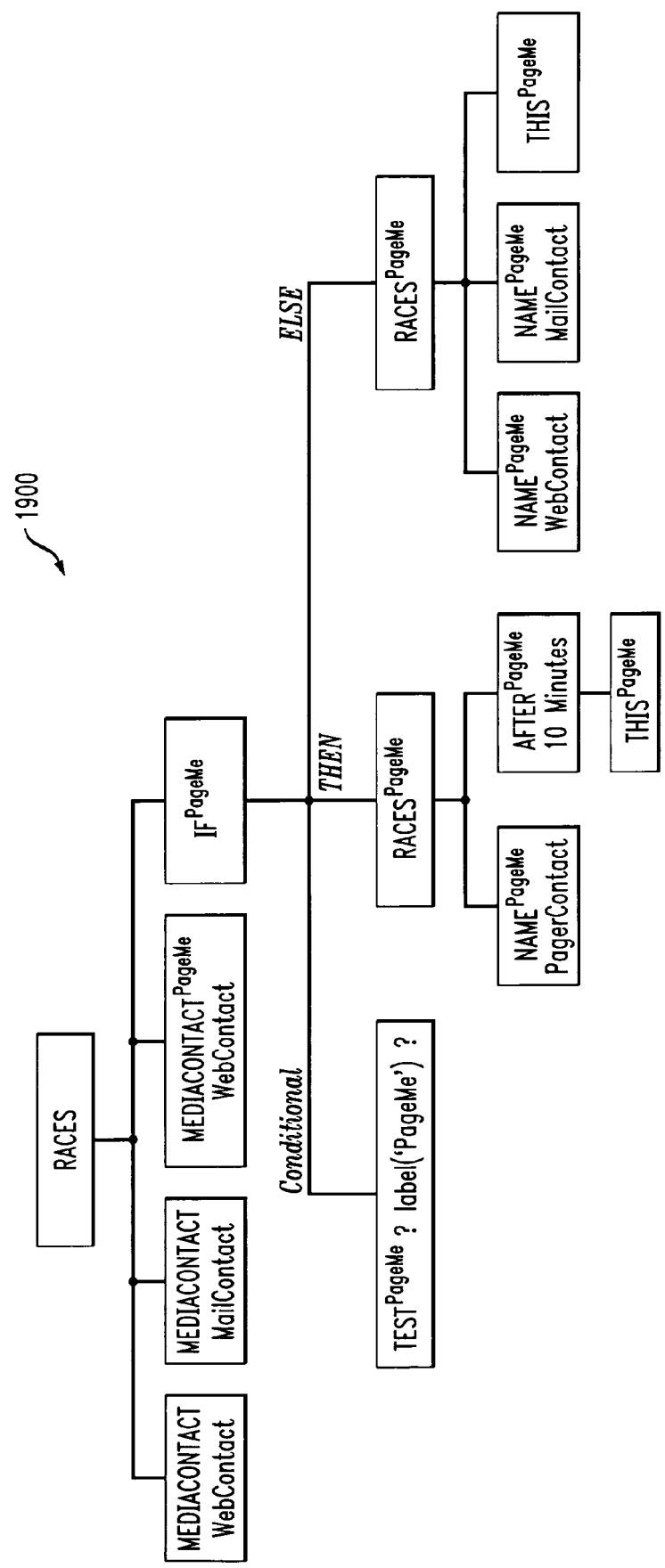
Figure 20:
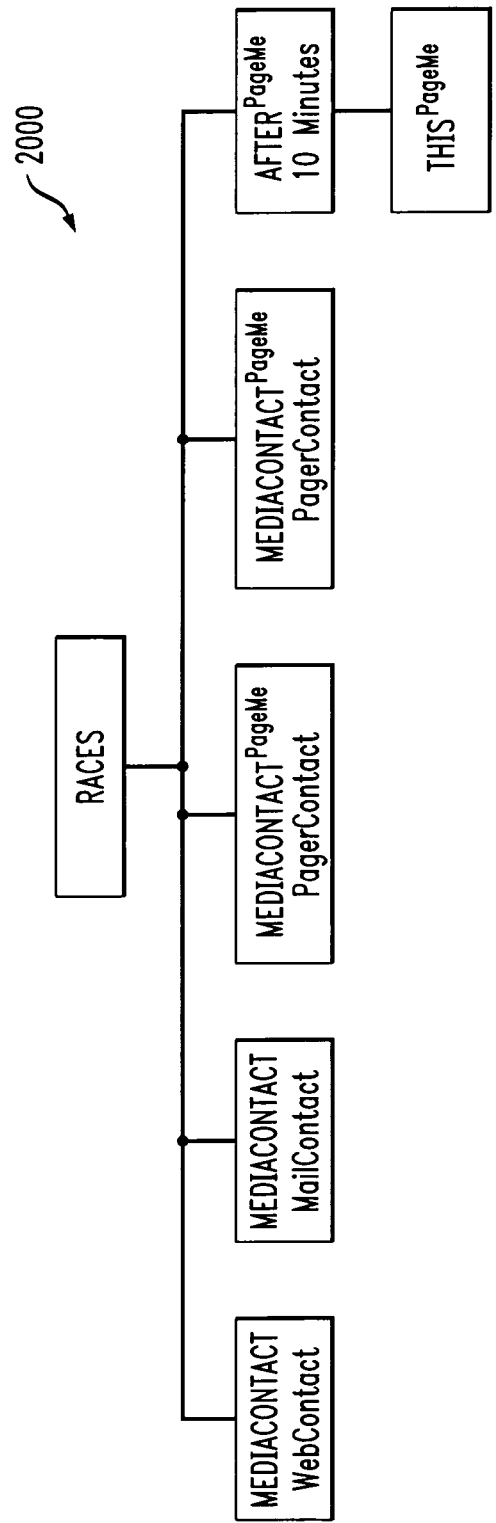

Additionally, optimizations can be implemented to reduce the memory usage of the parse tree itself. The original parse tree was binary, that is, each operator had two children. The new parse tree allows the operators to have more than two children, removing the need to allocate structures for chained expressions with the same operator. The memory is further reduced by collapsing the parse tree during runtime, as each name is resolved, if it produces a subtree rooted with an operator equivalent to its parent, then the children of the root in the subtree are promoted to children of the parent of the name. FIGS. 18-20 show this optimization for the pager example and are replacements for FIGS. 11-13.

Inline Media Contacts

Typically, media contact specifications are stored in a communication flow data store (e.g., LDAP directory or database) and are accessed using the name of the object in the data store. However, there are certain times when the application (or a presence system) may want to create a media contact "on-the-fly". This can be accomplished by using the CONTACT function, as follows:

CONTACT(string contactType, string owner, string address, . . . )

The "contactType" is the name of the implementation of the media contact; this might be a shared object or dynamically loaded library, or a Java class. The "owner" argument is the identifier of the owner of the object and "address" is the address the device will use to contact the owner. After the "address" argument, any number of parameters can be defined. Each parameter is a string defining a name/value pair in the form: "name=value".

When the contact function is parsed, a media contact of the given type is allocated and placed in the parse tree.

```
CONTACT("com.avaya.xui.contact.EmailContact",
  "nobody",
  "nobody@avaya.com",
  "protocol=HTML")
```

This creates a new Java node in the parse tree that will send HTML e-mail to the address "nobody@avaya.com". The string "protocol=HTML" is a parameter that the "com.avaya.xui.contact.EmailContact" Java object recognizes as meaning to send HTML formatted e-mail.

Among other benefits, inline media contacts enhance the dynamic delegation of communication flows. In this manner, communication flows can be dynamically altered when a request is received by replacing the media contact or the owner in the parse tree.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for providing a message from a sender to at least one recipient in accordance with a communication flow having a plurality of potential paths, said method comprising:
   receiving said message from said sender by a data-processing system in accordance with said communication flow;
   evaluating said communication flow by said data-processing system, wherein said communication flow is controlled by a communication flow expression that comprises a dynamic context, wherein said dynamic context comprises one or more of an update to data in said communication flow, a response received for said communication flow, and a state of said communication flow, wherein said dynamic context is established via at least one of a label that provides context and a context function that sets said context in said communication flow expression, and wherein said communication flow expression further comprises at least one primitive keyword indicating how said message should be processed in response to said dynamic context, wherein said primitive keyword is an evaluation function that specifies data being watched that will trigger evaluation of a specified conditional, wherein said evaluation function acts on changes to one or more of data and responses associated with said communication flow expression, and wherein said evaluation function allows an application to dynamically add one or more nodes to said communication flow during execution of said communication flow as a result of data updates or receipt of responses;
   processing said message by said data-processing system based on said communication flow expression and said dynamic context; and
   sending said message to said at least one recipient in accordance with said communication flow.

2. The method of claim 1, wherein said dynamic context is established by said data-processing system.

3. The method of claim 2, wherein said one or more labels are inherited by each child node of the node to which said one or more labels are applied.

4. The method of claim 2, wherein said one or more labels are unique.

5. The method of claim 2, wherein said one or more labels are a condition in a communication rule.

6. The method of claim 2, wherein one or more of said labels are tested by a conditional expression in a communication flow.

7. The method of claim 2, wherein said one or more labels identify a subscription that generated a message.

8. The method of claim 2, wherein said data-processing system applies one or more communication rules to said one or more labels to determine the preferred communication flow for delivering messages based on one or more subscriptions.

9. The method of claim 2, wherein said one or more labels identify phases of a communication.

10. The method of claim 2, wherein said one or more labels identify roles of recipients of a communication.

11. The method of claim 2, wherein said one or more labels control a rendering of said message.

12. The method of claim 1, wherein said context function enables an application to set a context for said communication flow expression that is executed at the root level.

13. The method of claim 12, wherein said context function invokes a method on the root of a subtree created by parsing a second argument of said context function to set said context.

14. The method of claim 13, wherein said method causes said context to propagate down said subtree, setting a context on all nodes that do not currently have a defined context.

15. The method of claim 1, wherein said primitive keyword is a watch operand that has an associated test expression that is evaluated at runtime, and wherein said watch operand will block until said associated test expression evaluates to true, and then said watch operand will evaluate to true.

16. The method of claim 15, wherein said watch operand evaluates said associated test expression the first time said associated test expression is encountered and if said associated test expression is false, then said associated test expression is evaluated each time the request data is modified or a response is submitted.

17. The method of claim 15, wherein said watch operand monitors a specific element in the data associated with said communication flow expression, or the responses associated with said communication flow expression and allows iteration over all values, and wherein said watch operand evaluates said associated test expression for each existing value or response, and then when a new value is added for said element being watched, or a new response is submitted.

18. The method of claim 1, wherein said primitive keyword is an advises or informs operator that causes an out-of-band communication flow expression to be evaluated outside of the scope of said main communication flow expression.

19. The method of claim 18, wherein a response received to said out-of-band communication flow expression is treated as a comment and does not affect the truth-value of the said main communication flow expression.

20. The method of claim 1, wherein said primitive keyword is a consult operator that evaluates all of its children and waits for one of them to result in a true or false value.

21. The method of claim 20, wherein said result is returned as the value of the operator, but the remaining operands are placed out-of-band so that they can continue operation without affecting an outcome of said communication flow expression.

22. The method of claim 1, wherein said primitive keyword is a contact function that allows a media contact to be defined directly in said communication flow expression.

23. The method of claim 22, wherein said contact function allows a communication flow to be dynamically delegated to another recipient.

24. An apparatus for providing a message from a sender to at least one recipient in accordance with a communication flow having a plurality of potential paths, said apparatus comprising:
   a memory that is non-transitory; and
   at least one processor, coupled to the memory, operative to:
   receive said message from said sender in accordance with said communication flow;

evaluate said communication flow by said data-processing system, wherein said communication flow is controlled by a communication flow expression that comprises a dynamic context, wherein said dynamic context comprises one or more of an update to data in said communication flow, a response received for said communication flow, and a state of said communication flow, wherein said dynamic context is established via at least one of a label that provides context and a context function that sets said context in said communication flow expression, and wherein said communication flow expression further comprises at least one primitive keyword indicating how said message should be processed in response to said dynamic context, wherein said primitive keyword is an evaluation function that specifies data being watched that will trigger evaluation of a specified conditional, wherein said evaluation function acts on changes to one or more of data and responses associated with said communication flow expression, and wherein said evaluation function allows an application to dynamically add one or more nodes to said communication flow during execution of said communication flow as a result of data updates or receipt of responses;

process said message based on said communication flow expression and said dynamic context; and send said message to said at least one recipient in accordance with said communication flow.

25. The apparatus of claim 24, wherein said dynamic context is established using one or more labels.

26. The apparatus of claim 24, wherein said context function enables an application to set a context for said communication flow expression that is executed at the root level.

27. The apparatus of claim 24, wherein said primitive keyword is a watch operand that has an associated test expression that is evaluated at runtime, and wherein said watch operand will block until said associated test expression evaluates to true, and then said watch operand will evaluate to true.

28. The apparatus of claim 24, wherein said primitive keyword is an advises or informs operator that causes an out-of-band communication flow expression to be evaluated outside of the scope of said main communication flow expression.

29. The apparatus of claim 24, wherein said primitive keyword is a consult operator that evaluates all of its children and waits for one of them to result in a true or false value.

30. The apparatus of claim 24, wherein said primitive keyword is a contact function that allows a media contact to be defined directly in said communication flow expression.

* * * * *